United States Patent [19]

Noguchi et al.

[11] 4,287,862
[45] Sep. 8, 1981

[54] OTTO-CYCLE INTERNAL COMBUSTION ENGINE

[75] Inventors: Masaaki Noguchi, Nagoya; Taro Tanaka, Chiryu; Yoji Kato, Okazaki, all of Japan

[73] Assignee: Nippon Soken, Inc., Nishio, Japan

[21] Appl. No.: 947,703

[22] Filed: Sep. 29, 1978

[30] Foreign Application Priority Data

| Oct. 3, 1977 | [JP] | Japan | 52-118807 |
| Oct. 5, 1977 | [JP] | Japan | 52-119861 |
| Dec. 2, 1977 | [JP] | Japan | 52-145552 |
| Dec. 5, 1977 | [JP] | Japan | 52-145872 |
| Dec. 19, 1977 | [JP] | Japan | 52-153279 |
| Dec. 22, 1977 | [JP] | Japan | 52-155337 |

[51] Int. Cl.³ ............................................. F02P 15/02
[52] U.S. Cl. ............................. 123/310; 123/536; 123/638; 123/606; 123/146.5 A
[58] Field of Search ........ 123/143 B, 148 DS, 148 E, 123/119 E, 146.5 A, 148 ND, 32 MS, 32 SP, 191 S, 191 SP, 37, 148 AC, 148 C

[56] References Cited

U.S. PATENT DOCUMENTS

| 2,093,339 | 9/1937 | Pippig | 123/32 SP |
| 2,578,145 | 12/1951 | Miller | 123/119 E |
| 2,866,447 | 12/1958 | Kaehni | 123/148 AC |
| 3,165,099 | 1/1965 | Vanderpoel | 123/148 DS |
| 3,504,230 | 3/1970 | Gaddes | 123/148 E |
| 4,051,828 | 10/1977 | Topic | 123/148 E |
| 4,124,003 | 11/1978 | Abe et al. | 123/148 DS |
| 4,161,936 | 7/1979 | Volsky | 123/148 E |

FOREIGN PATENT DOCUMENTS

| 46-13897 | 4/1971 | Japan | 123/148 E |
| 52-9729 | 1/1977 | Japan | 123/640 |
| 773700 | 5/1957 | United Kingdom | 123/148 DS |

Primary Examiner—Charles J. Myhre
Assistant Examiner—Andrew M. Dolinar
Attorney, Agent, or Firm—Cushman, Darby & Cushman

[57] ABSTRACT

In the ignition system of the internal combustion engine, a preignition control circuit is further provided. The preignition control circuit includes a high voltage generator which supplies a high voltage to the spark plug to produce a preignition spark between the electrodes of the spark plug. The preignition spark is timed to appear as the engine nearly concludes its suction stroke so that radicals are produced from the air-fuel mixture around the electrodes thereby to ensure reliable ignition and complete burning of the air-fuel mixture.

7 Claims, 29 Drawing Figures

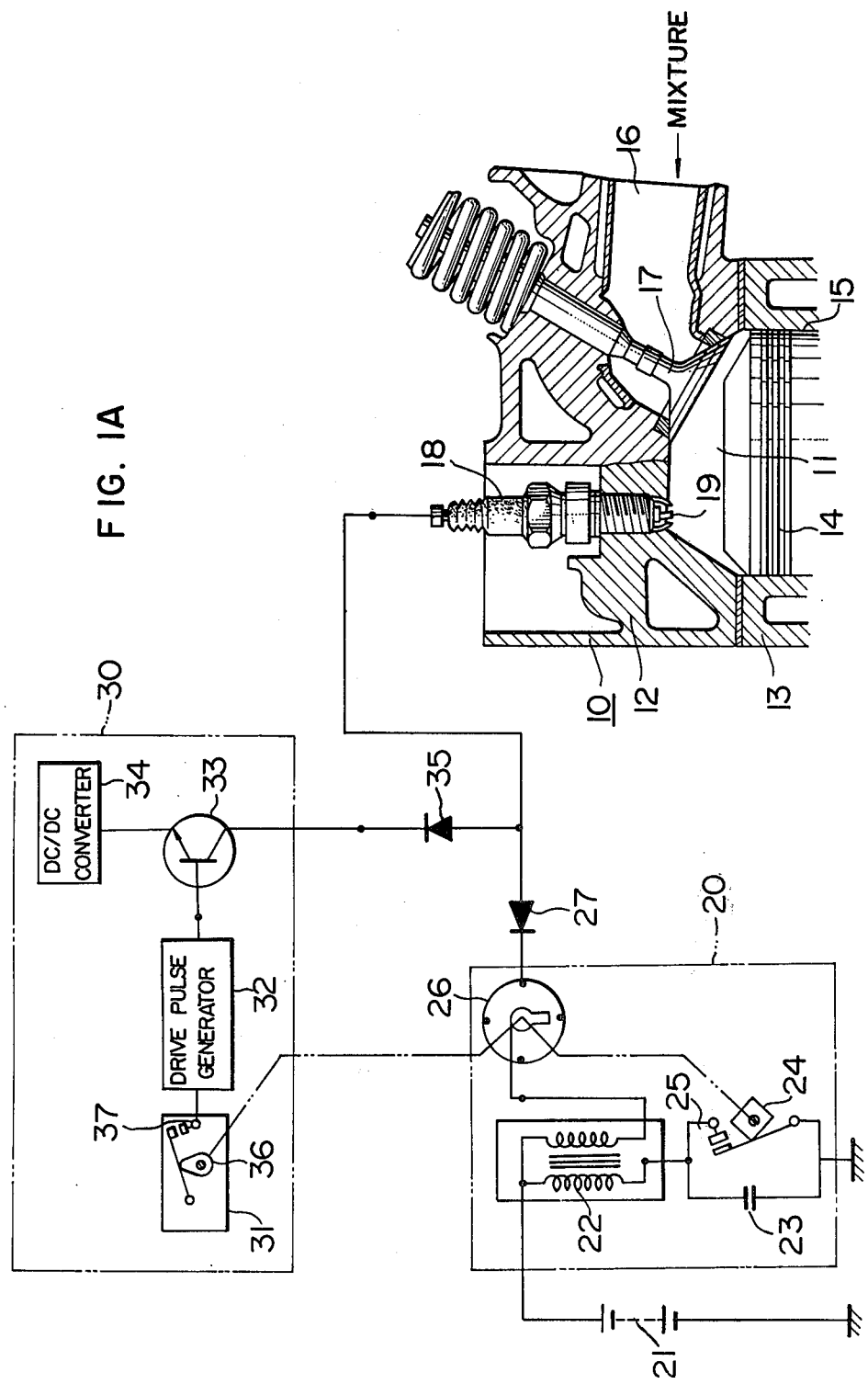
FIG. IA

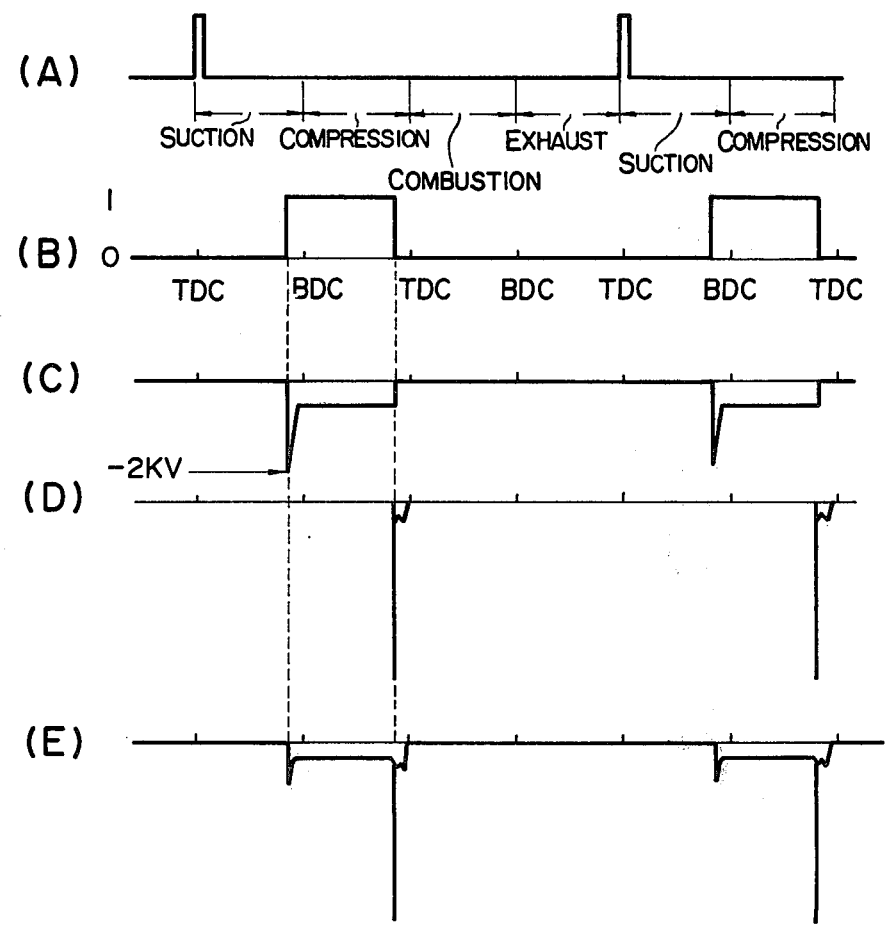
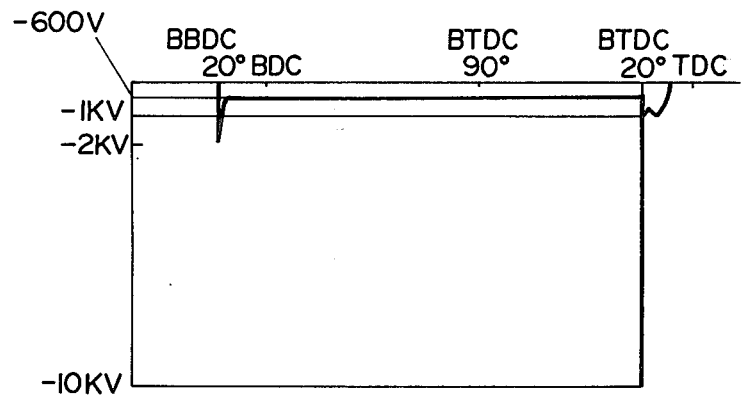

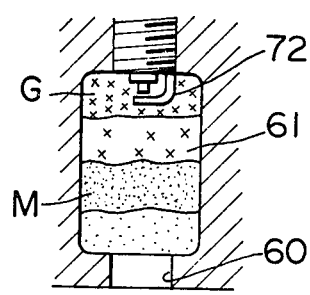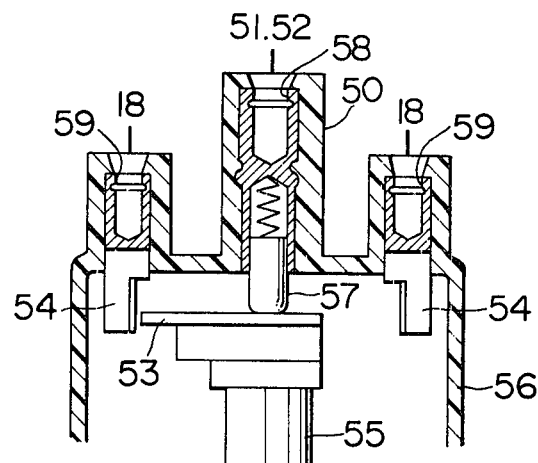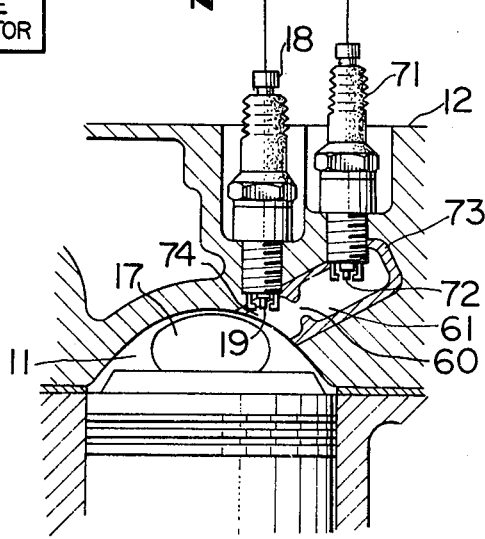

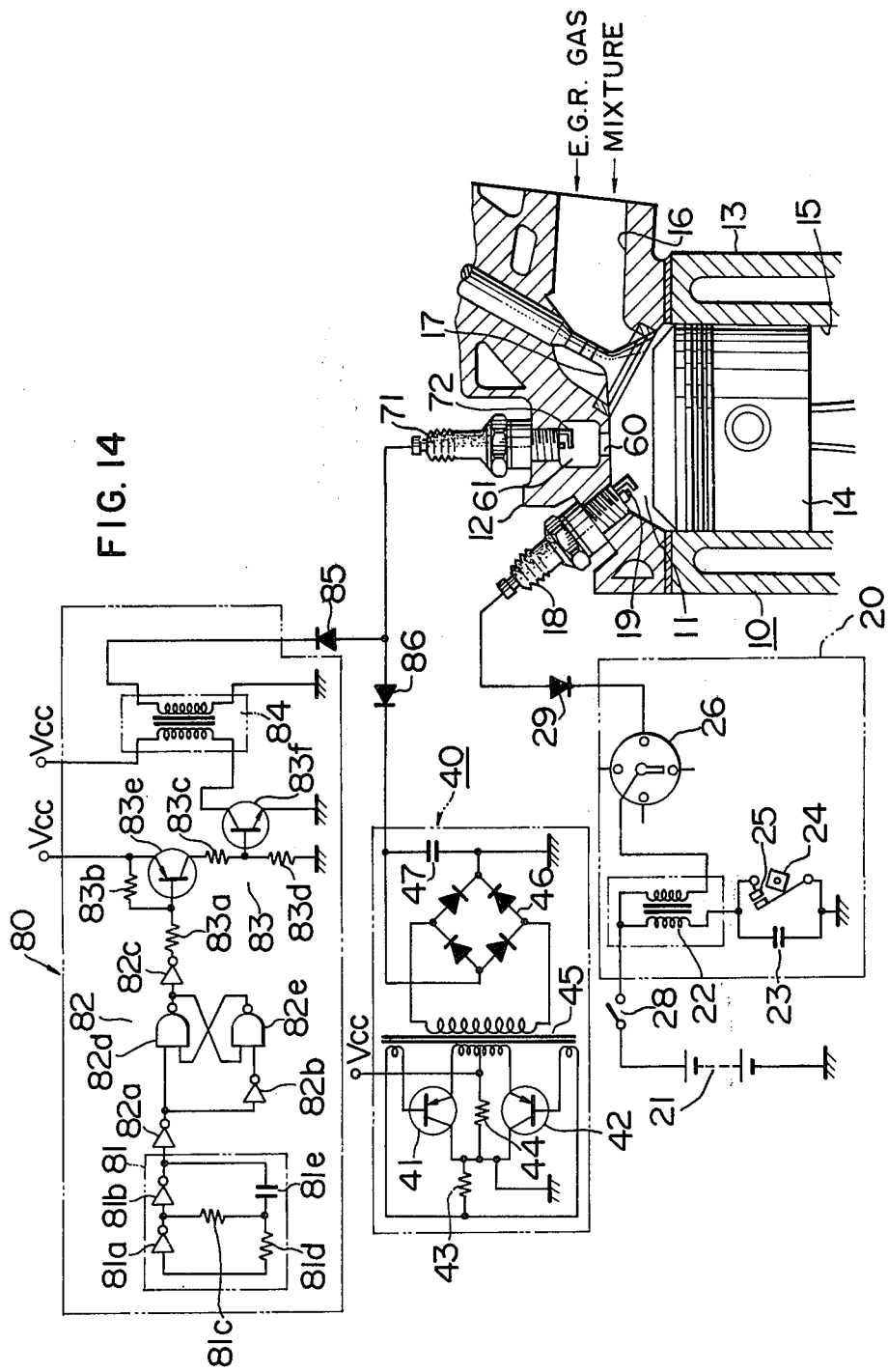

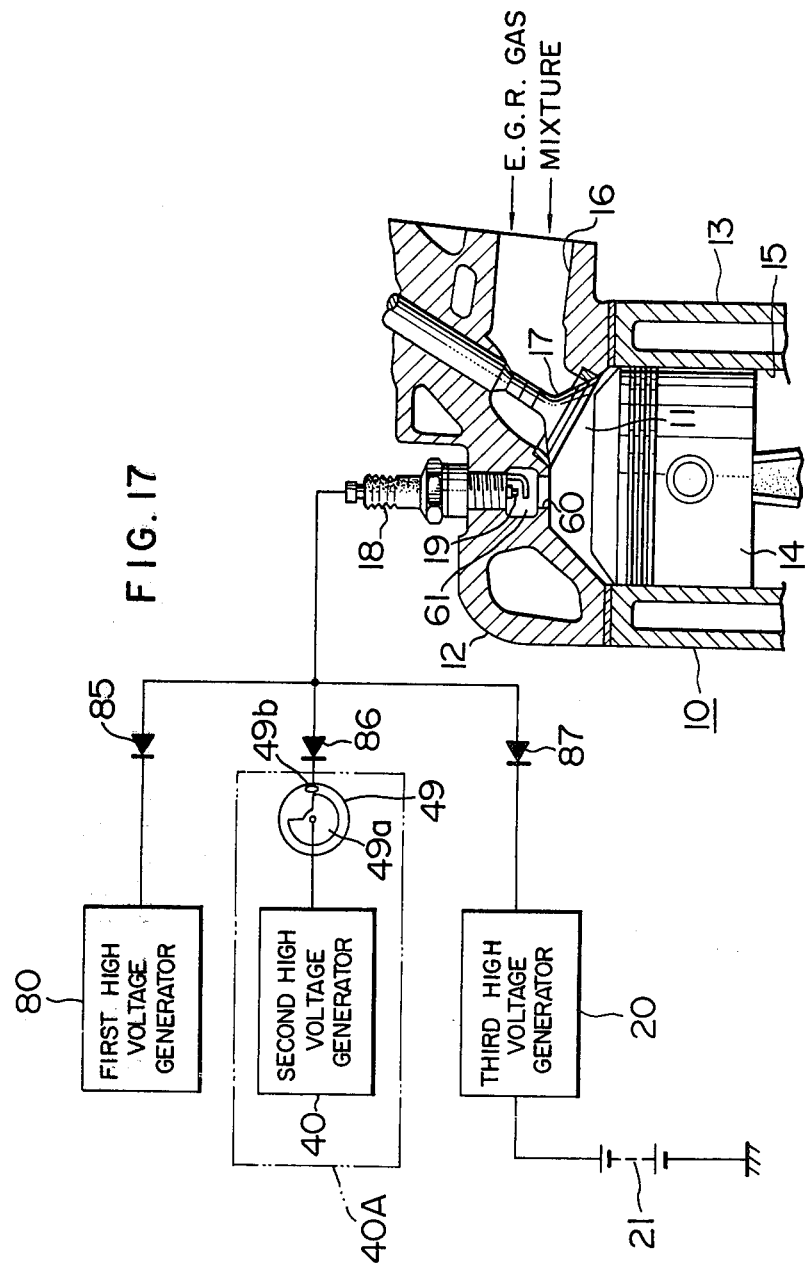

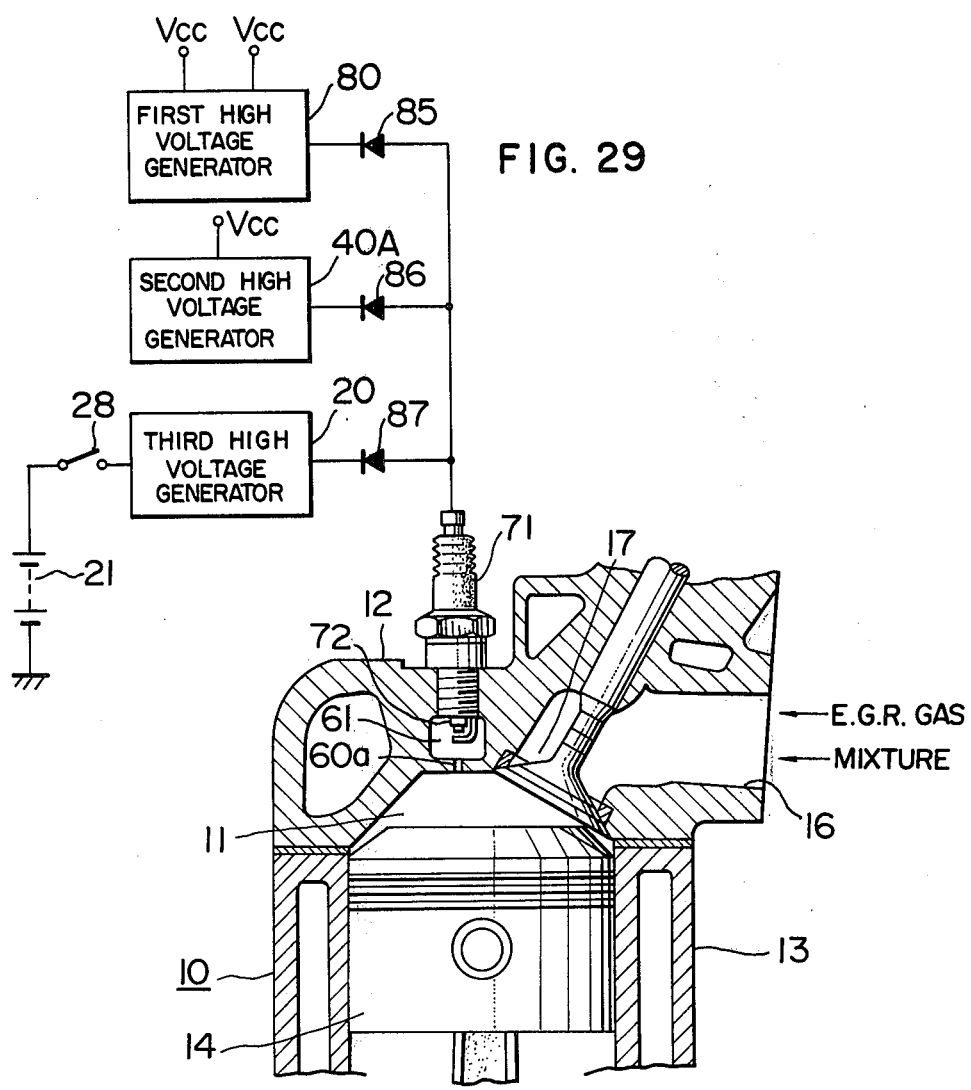

OTTO-CYCLE INTERNAL COMBUSTION ENGINE

BACKGROUND OF THE INVENTION

The present invention relates to Otto-cycle internal combustion engines, and more particularly the invention relates to a system for operating the engine in such a manner that improved fuel consumption and reduced amount of $NO_x$ emissions are ensured.

In a known type of mixture-compression type Otto-cycle engine, an ignition method is used in which a high voltage of 10 to 15 KV generated from the ignition system near the Top Dead Center of the engine is applied to the proper spark plug and a basically capacitive discharge is caused between the electrodes of the spark plug, thus producing an electric spark and thereby igniting the compressed air-fuel mixture.

However, this type of prior art method, particularly a method in which a high voltage is applied periodically is disadvantageous in that if the mixture is leaned out or the amount of exhaust gas recirculation is increased greatly, the mixture will be ignited insufficiently thus tending to cause misfire, the combustion will be made unstable, the fuel consumption will still remain insufficient and the amount of $NO_x$ emissions will also be large.

SUMMARY OF THE INVENTION

The present invention has been made in view of these circumstances, and it is the object of the invention to ensure positive ignition of the air-fuel mixture and thereby to improve the fuel consumption and reduce the amount of $NO_x$ emissions.

Thus, in accordance with one aspect of the invention, and inductive discharge is initiated by the discharge electrodes disposed in the combustion chamber before explosion combustion or near the Bottom Dead Center during the transition from the suction stroke to the compression stroke so as to convert part of the air-fuel mixture into radicals and chemically activate the same, and in this way an improved ignition quality and stable combustion can be ensured in cases where the mixture is leaned out or the amount of exhaust gas recirculation is increased greatly. Another great advantage is that an improved fuel consumption and reduced $NO_x$ emissions can be attained.

In accordance with another aspect of the invention, a separate radical producing chamber is provided above the combustion chamber, whereby even if a radical producing spark plug is continuously energized, the occurrence of engine knock and premature ignition can be prevented by the previously produced combustion gas.

In accordance with still another aspect of the invention, there are further provided a first high voltage generator for causing a periodic discharge between the discharge electrodes and a second high voltage generator for causing a continuous discharge between the discharge electrodes, whereby the air-fuel mixture is activated by the combination of the intermittent discharge and the continuous discharge, thus ensuring more positive and satisfactory activation of air-fuel mixture by virtue of the combined effect of the two discharges.

In accordance with still another aspect of the invention, radicals are produced by the first spark plug in the radical producing chamber and the air-fuel mixture including the radicals is ignited by the second spark plug in the combustion chamber, thus ensuring improved combustion. Another advantage is that energization of the radical producing spark plug does not cause knocking and abnormal premature ignition in the engine. Still another advantage is that it can be easily arranged so that radical-combustion operation is accomplished only when it is desired and the ordinary spark-ignition operation is effected during the periods of high speed operation, etc.

BRIEF DESCRIPTION OF THE DRAWINGS

FIG. 1A is a schematic diagram showing a first embodiment of a system for performing the method of this invention.

FIGS. 2 and 3 are ignition waveform diagrams for the system shown in FIG. 1A.

FIG. 13 is an enlarged sectional view showing the principal parts of the distributor shown in FIG. 12.

FIG. 14 is a schematic diagram showing the overall construction of a fourth embodiment of the system.

FIG. 15 is a sectional view showing the radical producing chamber shown in FIG. 14.

FIG. 16 is a sectional schematic view showing another embodiment of the system.

FIG. 17 is a schematic diagram showing the overall construction of a fifth embodiment of the system.

FIG. 29 is a schematic diagram showing the overall construction of still another embodiment of the system used with the invention.

DESCRIPTION OF THE PREFERRED EMBODIMENTS

First Embodiment

Figure 1B:
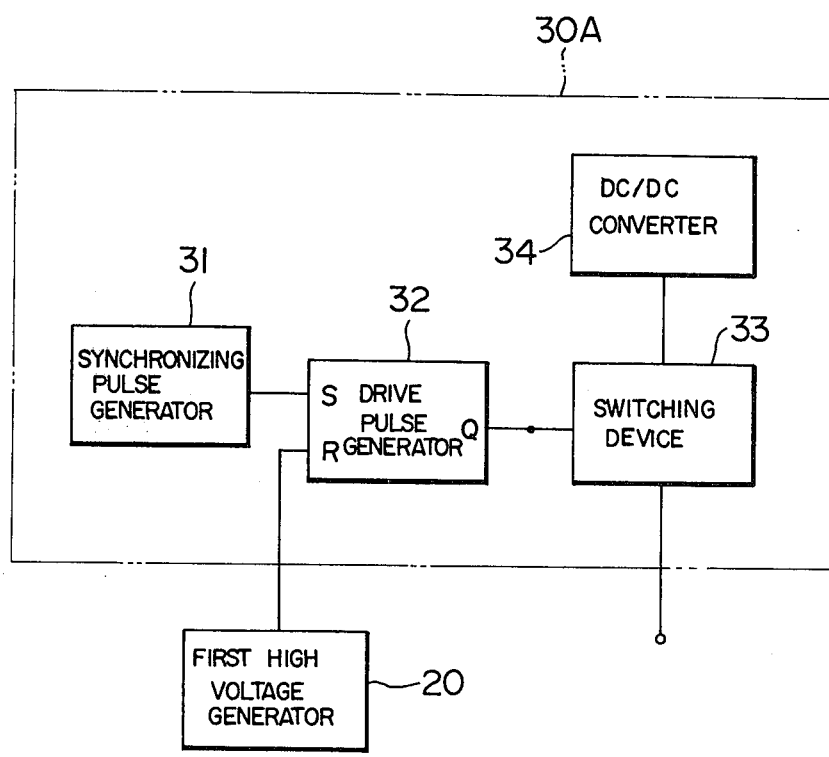
FIG. 1B is a partial block diagram showing a modification of the system shown in FIG. 1A.

Referring to FIGS. 1A and 1B, a mixture-compression type Otto-cycle engine 10 is a known type of four cylinder, four cycle reciprocating engine whose combustion chamber 11 is defined by a cylinder head 12, a cylinder block 13 and a piston 14. The piston 14 moves back and forth in a cylinder 15 provided in the cylinder block 13 and it generates a turning energy through a connecting rod and a crankshaft which are not shown.

The cylinder block 12 is provided with an intake port 16 and an intake valve 17, so that the air-fuel mixture produced by a carburetor which is not shown, is drawn into the combustion chamber 11 and the cylinder 15 when the piston 14 is moved downward on the suction stroke in which the intake valve 17 is opened.

Screwed into the cylinder head 12 is a spark plug 18 whose discharge electrodes 19 are disposed in the combustion chamber 11.

Next, an ignition system for causing the discharge electrodes 19 to produce a discharge thereat will be described. A first high voltage generator 20 is of a known type which applies to the spark plug 18 a high voltage of 10 to 15 KV, and it comprises an ignition coil 22, a capacitor 23, a cam 24 rotated in synchronism with the crankshaft of the engine 10, contacts 25 which are opened and closed by the cam 24 and a distributor 26, and the generator 20 is connected to a battery 21 and also to the spark plug 18 through a diode 27. The first high voltage generator 20 applies a high voltage to the spark plug 18 near 20 degrees Before Top Dead Center (BTDC) of the piston 14 on its compression stroke.

A second high voltage generator 30 is provided to cause an inductive discharge at the spark plug 18, and it comprises a synchronizing pulse generator 31 for generating synchronizing pulses in synchronism with the rotation of the engine 10, a drive pulse generator 32 for generating drive pulses in response to the synchronizing pulses, a high withstand voltage transistor 33 adapted to be turned on and off by the drive pulses and a DC/DC converter 34 for delivering an output of about 4 W and generating a high voltage of about 6 KV. The second high voltage generator 30 is connected to the spark plug 18 through a diode 35. Although not shown, the second high voltage generator 30 is provided for each of the cylinders.

The synchronizing pulse generator 31 comprises a single-lobe cam 36 which rotates once for every two revolutions of the crankshaft of the engine 10 in synchronism with the rotation thereof and contacts 37 which are opened and closed by the cam 36, and it generates a synchronizing pulse at TDC after the completion of the compression stroke as shown in (A) of FIG. 2.

The drive pulse generator 32 comprises a known type of delay circuit, monostable multivibrator, etc., and it is responsive to the synchronizing pulse to generate a rectangular drive pulse from 20 degrees BBDC during the transition from the suction stroke to the compression stroke to 20 degrees BTDC as shown in (B) of FIG. 2.

The DC/DC converter 34 generates a high voltage of about 6 KV when the output terminal is opened and it is connected to the spark plug 18 or the load. Thus, by virtue of the discharge-resistance characteristic of the spark plug 18, an ignition voltage of a waveform as shown in (C) of FIG. 2 is generated which rises to about 2 KV and then drops to 600 V. In other words, when the applied voltage rises to 2 KV, the spark plug 18 initiates a discharge so that once the discharge is initiated, ions are produced between the discharge electrodes 19 with the resulting drop in the resistance and a current of 6.6 mA flows at about 600 V, thus maintaining the inductive discharge. With the present embodiment, the center electrode of the spark plug 18 is a negative electrode and consequently the voltage is shown as a negative voltage in (C), (D) and (E), respectively, of FIGS. 2 and 3.

The second high voltage generator 30 may be constructed as shown in FIG. 1A. More specifically, it may be so constructed that the synchronizing pulse generator 31 generates a trigger pulse, as for example, at 20 degrees BBDC following the end of the suction stroke and applies it as a set signal to the drive pulse generator 32 comprising a bistable multivibrator, and the signal from the contacts 25 of the first high voltage generator 20 is applied as a reset signal to the bistable multivibrator. In this way, a signal is generated from the end of the suction stroke to the end of the compression stroke, that is, the drive pulse shown in (B) of FIG. 2 is generated. In the Figure, numeral 33 designates a switching device such as a thyristor.

With the construction described above, during the suction stroke of the engine 10, the intake port 17 is opened and the air-fuel mixture is introduced into the combustion chamber 11 through the intake port 16. In this case, although it differs in dependence on the load of the engine 10, the pressure in the combustion chamber 11 is about −360 mmHg in the case of a 1,600 cc, four cylinder, OHV, four cycle gasoline engine at the engine speed of 1,600 rpm and the load (output torque) of 2 Kg-m.

When 20 degrees BBDC on the suction stroke is reached, the drive pulse from the drive pulse generator 32 of the second high voltage generator 30 goes to a "1" level so that the transistor 33 is turned on and the output of the DC/DC converter 34 is applied to the spark plug 18.

Thus, from 20 degrees BBDC and on the second high voltage generator 30 applies to the spark plug 18 the ignition voltage of the waveform shown in (C) of FIG. 2 or FIG. 3 and the spark plug 18 initiates a discharge in response to the voltage.

Since this discharge takes place near BBDC on the suction stroke and not under the high pressure after the compression of the air-fuel mixture as in the case of the prior art systems, the spark plug 18 can easily initiate a discharge in response to a voltage of about 2 KV.

Also, due to the fact that the discharge is initiated at a low voltage of about 2 KV as mentioned previously, this discharge takes place as an inductive discharge which is different from the conventional capacitive discharge. Once the inductive discharge is started, due to the ions produced between the electrodes 19, the electrode voltage is dropped by the breakdown to a low voltage of about 600 V but the discharge is satisfactorily maintained by this voltage.

In this condition, while the mixture has been introduced into the combustion chamber 11 and the inductive discharge has been initiated by the spark plug 18, due to the low pressure condition before the compression of the mixture, no explosion combustion takes place. Thus, after the delay of some time from the time of start of the inductive discharge, as for example, at about 30° crank angle after BDC, there is initiated a semi-oxidation state chemical reaction which cannot be considered as an explosive combustion.

This reaction is one which is called a radical producing reaction in which part of the gasoline in the air-fuel mixture is modified by the radical producing reaction and converted into chemically highly active radicals (intermediate combustion products) including $C_2$, CH, CHO, OOH, H, etc.

Thereafter, when 20° crank angle before TDC is reached, the drive pulse generated from the drive pulse generator 32 of the second high voltage generator 30 goes to a "0" level, so that the transistor 33 is turned off and the inductive discharge at the spark plug 18 is stopped.

Simultaneously, the contacts 25 of the first high voltage generator 20 are opened and the resulting high voltage induced in the ignition coil 22 is applied to the spark plug 18 through the distributor 26 and the diode 27.

When the applied voltage reaches about 10 KV as shown in (D) of FIG. 2 and FIG. 3, the spark plug 18 produces a capacitive discharge, causes a breakdown and maintains a voltage of about 1 KV for some period of time, and the discharge is terminated at near 10° crank angle before TDC. This time interval is dependent on the energy held in the ignition coil 22 and it ends when the energy is completely discharged.

On the other hand, the radicals produced by the previously mentioned inductive discharge are distributed, in their chemically activated state, over all or part of the combustion chamber 11 during the compression stroke of the engine 10. The radicals are compressed by the piston 14 to a greater degree of activation and consequently an extremely satisfactory ignition quality is ensured.

As a result, the spark discharge caused at the spark plug 18 by the first high voltage generator 20 at near 20° crank angle before TDC, positively and satisfactorily ignites the air-fuel mixture including the radicals and there practically occurs no ignition lag.

When the explosion combustion is initiated by this ignition, since the radicals are already in the semi-oxidized state, the radicals are burned at a lower combustion rate than the ordinary air-fuel mixture, so that the pressure in the cylinder 15 is continuously increased and the combustion energy is efficiently transmitted to the piston 14, thus satisfactorily driving the load.

By virtue of the fact that the air-fuel mixture includes the radicals and hence its ignition quality is excellent, positive ignition of the mixture is ensured in cases where the mixture is leaned out or the exhaust gas is recirculated in a great quantity to the intake system.

This has the effect of improving the fuel consumption of the engine 10 and also, when coupled with the slow combustion, has the effect of decreasing the amount of $NO_x$ emissions.

While, in the embodiment described above, the inductive discharge is initiated from 20 degrees BBDC with BDC during the transition from the suction stroke to the compression stroke taken as a reference, it is possible to produce radicals by causing a discharge at least in the range of 90 degrees BBDC and 90 degrees ABDC.

Further, while the electrodes 19 of the spark plug 18 are used as discharge electrodes, the wall surface of the combustion chamber may be used as one of the electrodes, and other types of discharge electrode may also be used.

Further, while, in the above-described embodiment, the air-fuel mixture including the radicals is ignited by the spark-ignition method through the first high voltage generator 20, the ignition may be effected by means of compression-ignition or glow plug. Even if the compression-ignition is used, there is of course no need to increase the compression ratio as in the case of Diesel engines, and a compression ratio of about the same order as that of the ordinary gasoline engine may be used satisfactorily.

Further, while the method of this invention has been described as used in the operation of the four cycle engine, the method may also be used with two cycle engines as well as Wankel type rotary engines. In the case of the two cycle engine, the scavenging stroke may be considered as the suction stroke, and in the case of the Wankel type rotary engine it is only necessary to provide a spark plug so that the spark plug is positioned in the working chamber (combustion chamber) when the rotary piston is at the Bottom Dead Center position.

Second Embodiment:

The second embodiment differs from the first embodiment in that there is provided a sub-combustion chamber, namely, a radical producing chamber communicated with the main combustion chamber to burn the compressed air-fuel mixture in the main and sub-combustion chambers which are communicated with each other, whereby an inductive discharge is caused between electrodes disposed in the sub-combustion chamber prior to an explosion combustion of the mixture so that the mixture in the sub-combustion chamber is chemically activated by the inductive discharge and the activated component is retained in the sub-combustion chamber. Its first and second high voltage generators are identical with the counterparts of the first embodiment and will not be described. Thus, the following description will be directed primarily to the differences between the embodiments.

Figure 4:
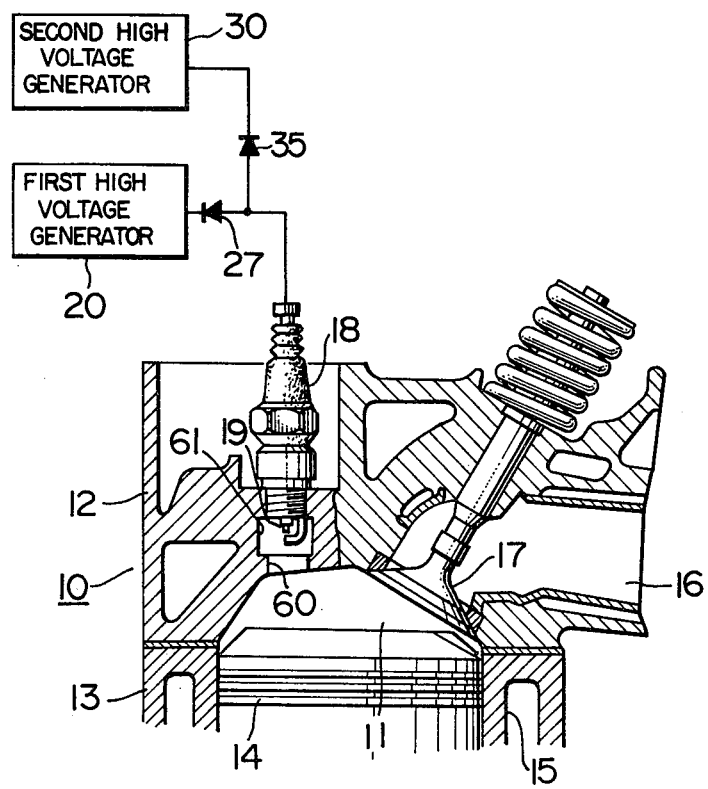
FIG. 4 is a schematic diagram showing a second embodiment of the system for performing the method of this invention.

Referring now to FIG. 4, the cylinder head 12 includes a sub-combustion chamber 61 which is smaller in volume than the main combustion chamber 11 and communicated with the latter through a passage 60. The spark plug 18 is screwed into the cylinder head 12 in such a manner that its discharge electrodes 19 are positioned in the sub-combustion chamber 61.

High voltage generators for causing discharges between the electrodes 19 of the spark plug 18 are identical in construction and operation with the counterparts in the first embodiment shown in FIG. 1.

With the construction described above, during the suction stroke of the engine 10, the intake valve 17 is opened and the air-fuel mixture is introduced into the main combustion chamber 11 by way of the intake port 16. Although it depends on the load on the engine 10, the pressure in the main and sub-combustion chambers 11 and 61 will be about −360 mmHg in the case of for example 1,600 cc, four cylinder, OHV, four cycle gasoline engine at the engine speed of 1,600 rpm and the load (output torque) of 2 Kg-m as mentioned previously.

Starting at 20 degrees BBDC, the ignition voltage of the waveform shown in (C) of FIG. 2 and FIG. 3 is applied from the second high voltage generator 30 to the spark plug 18, and the spark plug 18 initiates a discharge in response to the ignition voltage.

As mentioned previously, once this discharge is initiated, due to the ions produced between the electrodes 19, the electrode voltage is dropped by the breakdown to a low voltage of about 600 V as shown in FIG. 3, and this low voltage satisfactorily maintains the discharge.

In this case, while, with the air-fuel mixture being previously introduced into the main combustion chamber 11, the mixture is also introduced into the sub-combustion chamber 61 and the spark plug 18 produces an inductive discharge, no explosion combustion is started due to the low pressure condition before the compression of the mixture. After the expiration of some period of time following the initiation of the inductive discharge, as for example, at near 30° crank angle after BDC there is initiated a semi-oxidation chemical reaction which cannot be considered as an explosive combustion and thus part of the gasoline in the air-fuel mixture is modified and converted into radicals by the radical producing reaction.

Thereafter, when 20° crank angle BTDC is reached, the inductive discharge at the spark plug 18 is stopped by the second high voltage generator 30. At the same time, the high voltage produced in the ignition coil 22 (FIG. 1) by the first high voltage generator 20 is applied to the spark plug 18.

When the applied voltage reaches about 10 KV, the spark plug 18 produces a capacitive discharge and causes a breakdown, so that a voltage of about 1 KV is maintained for some period of time and the discharge is terminated at near 10° crank angle BTDC.

On the other hand, the radicals produced by the inductive discharge are not diffused by turbulences caused in the main combustion chamber 11 by the upward movement of the piston 14, and the radicals are held in the subcombustion chamber 61 in the chemically activated state. The radicals are compressed by the piston 14 to a higher degree of activation and a very excellent ignition quality is ensured.

As a result, the radicals are positively and satisfactorily ignited by the spark discharge caused by the first high voltage generator 20 at near 20° crank angle BTDC.

By virtue of this ignition, the flame and the radicals are spouted from the sub-combustion chamber 61 into the main combustion chamber 11 through the passage 60 and consequently an explosive combustion is initiated. Since the radicals are already in the semi-oxidized state, the radicals are burned at a lower combustion rate than the ordinary air-fuel mixture so that the pressure in the cylinder 15 is continuously increased and the combustion energy is efficiently transmitted to the piston 14, thus satisfactorily driving the load.

By virtue of the fact that the air-fuel mixture is ignited by utilizing the radicals, an excellent ignition quality is ensured and consequently the mixture can be positively ignited even in cases where the mixture is leaned out or the exhaust gas is recirculated in a large quantity to the intake system.

This has the effect of improving the fuel consumption of the engine 10 and also has the effect of, when coupled with the slow combustion, reducing the amount of $NO_x$ emissions.

Figure 5:
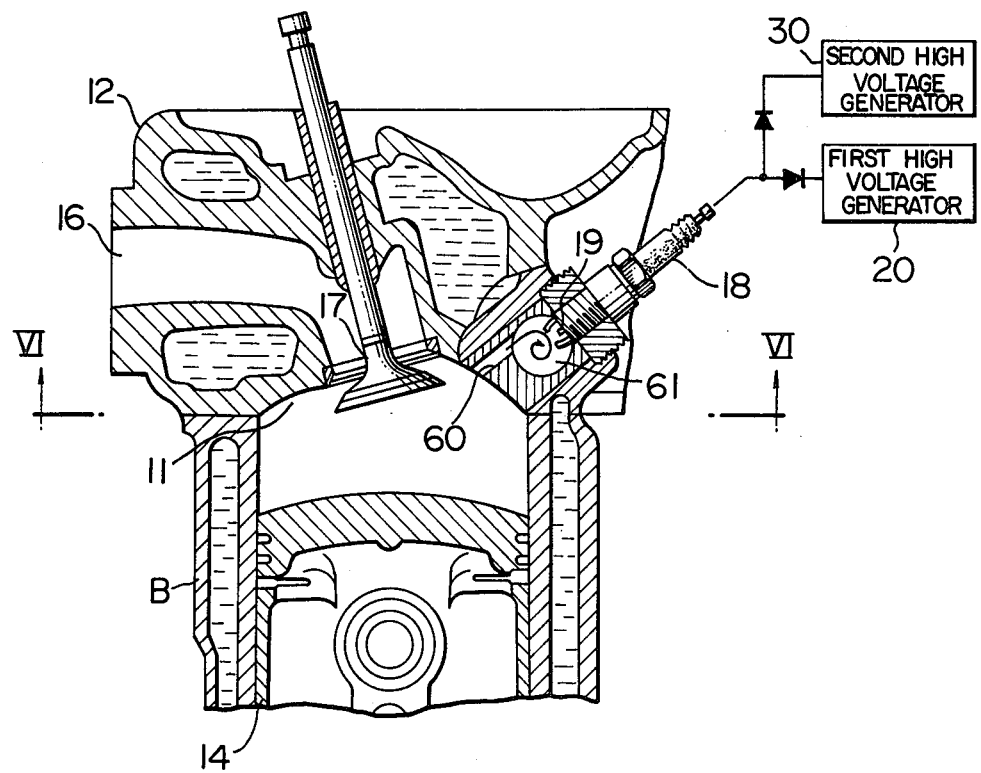
FIG. 5 is a sectional view showing still another embodiment of the system for performing the method of this invention.
Figure 6:
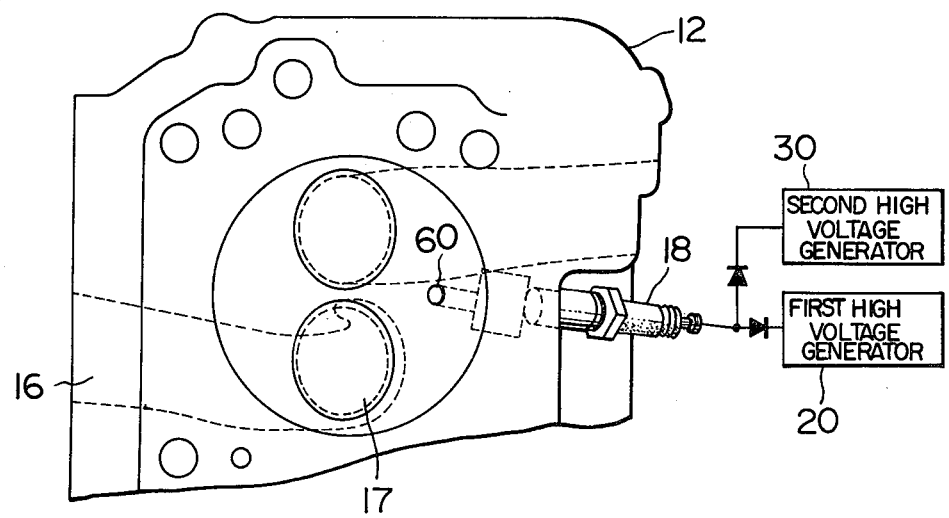
FIG. 6 is a plane view taken along the line VI—VI of FIG. 5.
Figure 7:
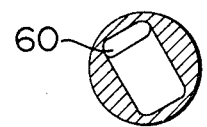
FIG. 7 is a sectional view showing another embodiment of the passage.

The location and shape of the sub-combustion chamber 61 are not limited to those of the above-mentioned embodiment, and the chamber 61 may be provided as shown in FIGS. 5 and 6. In FIGS. 5 and 6, the sub-combustion chamber 61 is shaped into a cylindrical form and the passage 60 is in the form of a round hole which is opened into the subcombustion chamber 61 tangentially. In this case, the passage 60 may be in the form of an elliptical hole as shown in FIG. 7.

Figure 8:
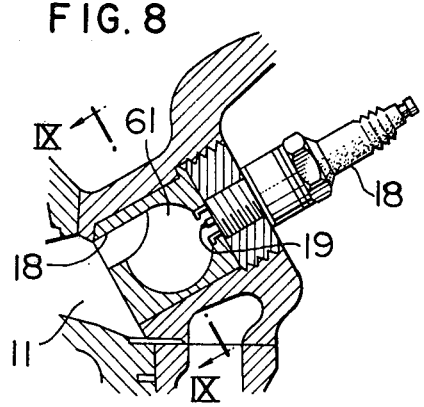
FIGS. 8 and 10 are sectional views showing another embodiments of the sub-combustion chamber.
Figure 9:
FIG. 9 is a sectional view taken along the line IX—IX of FIG. 8.
Figure 10:
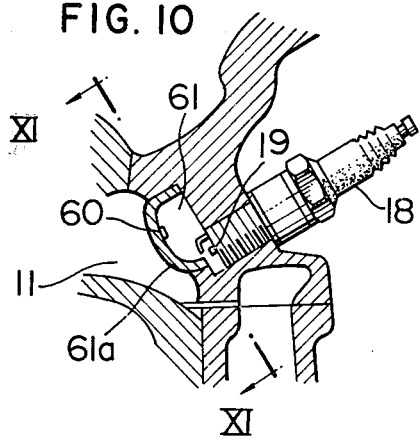
Figure 11:
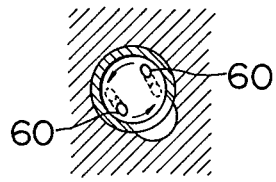
FIG. 11 is a sectional view taken along the line XI—XI of FIG. 10.

With the sub-combustion chamber 61 constructed as described above, when the air-fuel mixture flows into the sub-combustion chamber 61 from the main combustion chamber 11 during the initial period of the compression stroke, the mixture moves in a swirling stream within the sub-combustion chamber 61 and the low temperature fresh air-fuel mixture flowing into the sub-combustion chamber 61 and the high temperature residual gas remaining in the chamber 61 are separated by centrifugal force in such a manner that the fresh air-fuel mixture is gathered in the inner peripheral portion and a discharge is applied to the fresh mixture, thus effectively producing radicals. Since the produced radicals are small in molecular weight and high in temperature, the gas density of the radicals is reduced and consequently the radicals are gathered in the central portion of the sub-combustion chamber 61 by centrifugal separating force. In this way, the produced radicals are held within the sub-combustion chamber 61 in a satisfactory manner. The sub-combustion chamber 61 may also be shaped into a spherical form with the passage 60 opening thereinto tangentially as shown in FIGS. 8 and 9, and in this way it is possible to satisfactorily produce and maintain radicals by virtue of a vortex flow of the mixture. Also, as shown in FIGS. 10 and 11, the desired effects may be obtained by defining the sub-combustion chamber 61 by a cap 61a of a curved shape and providing two oblique passages 60 in the cap 61a to produce a vortex flow as shown by the arrows in FIG. 11. Further, while, in the above-described embodiment, the main combustion chamber 11 is communicated with the sub-combustion chamber 61 through the passage 60, a recess may be bored out in the cylinder head 12 to use it as a sub-combustion chamber.

Further, while, in the above-described embodiment, an inductive discharge is initiated at 20 degrees BBDC utilizing as a reference BDC in the course of transition from the suction stroke to the compression stroke, it is only necessary that the inductive discharge occurs prior to the occurrence of explosive combustion, and preferably a discharge should be caused at least in the range from 90 degrees BBDC to 90 degrees ABDC in order to produce radicals satisfactorily.

Further, while the electrodes 19 of the spark plug 18 are used as discharge electrodes, the wall surface of the sub-combustion chamber 61 may be used as one of the discharge electrodes, and other types of discharge electrode may also be used.

Further, while, in the above-described embodiment, the radicals are ignited by the spark-ignition process through the first high voltage generator 20, the compression-ignition as well as the ignition by a glow plug may also be used. Even in the case of the compression-ignition, there is of course no need to increase the compression ratio as in the case of Diesel engines and it is only necessary to use a compression ratio of about the same order as the ordinary gasoline engine.

Further, while the embodiment has been described as used in the operation of the four cycle engine, the embodiment may also be used in the operation of two cycle engines as well as Wankel type rotary engines. In the case of the two cycle engine the scavenging stroke may be considered as the suction stroke, and in the case of the Wankel type rotary engine it is only necessary to mount a spark plug in a sub-combustion chamber provided so as to communicate with the working chamber (combustion chamber) when the rotary piston is at the BDC position.

Third Embodiment

This embodiment differs from the first embodiment in the method of applying the high voltages to the discharge electrodes of the spark plug.

Figure 12:
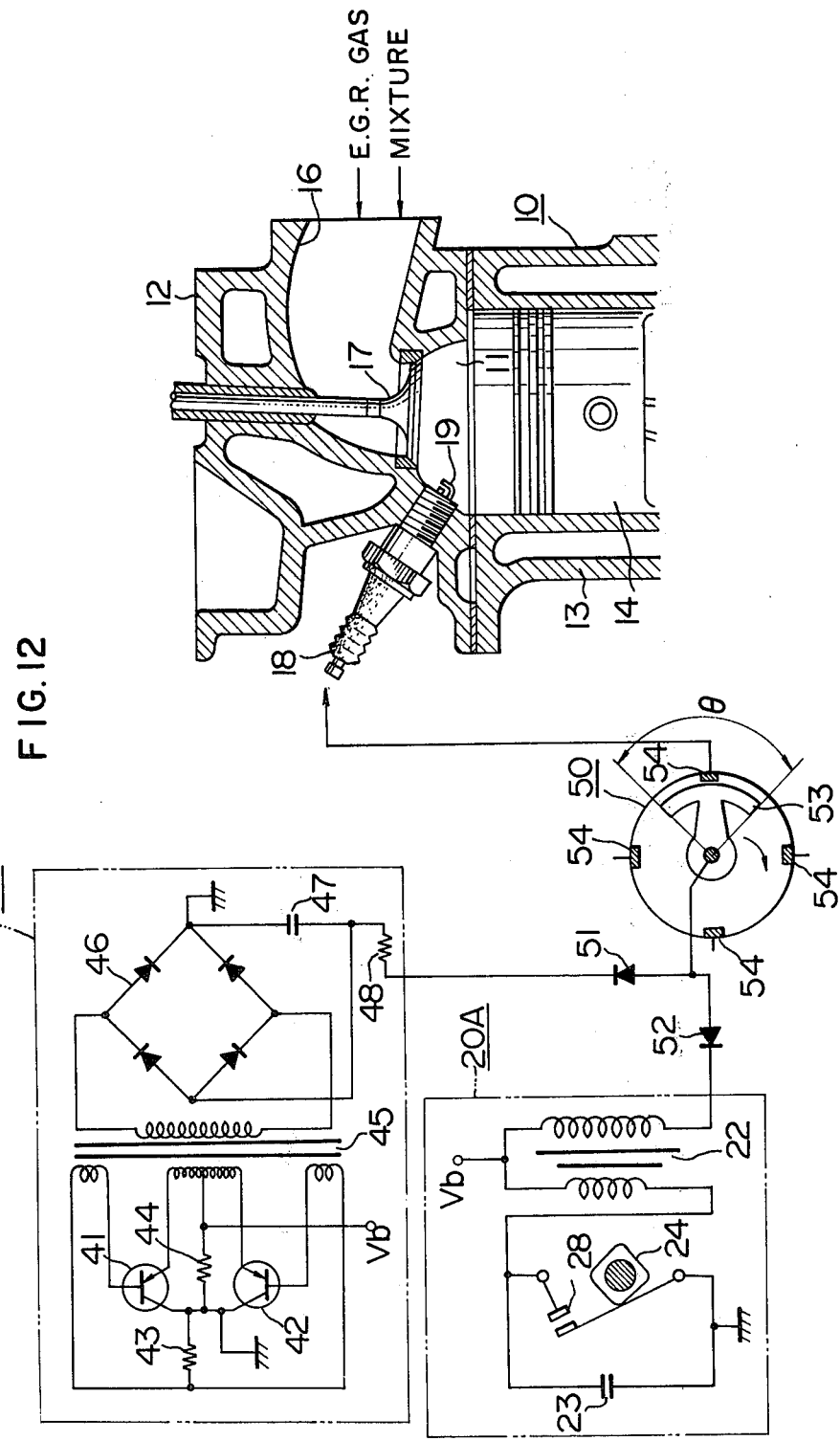
FIG. 12 is a schematic diagram showing the overall construction of a third embodiment of the system for performing the method of this invention.

Referring now to FIG. 12, the lean air-fuel mixture produced in the carburetor (not shown) is sucked into the combustion chamber 11 during the suction stroke where the intake valve 17 is opened. The spark plug 18 is mounted in a manner that its electrodes 19 are positioned in the combustion chamber 11.

In this connection, each cylinder of the engine 10 is supplied with the air-fuel mixture as well as a large quantity of the exhaust recirculation gas (EGR gas) from the exhaust system (not shown) of the engine 10 through a known type of exhaust gas control valve (not shown).

Next, high voltage generators for causing discharges between the electrodes 19 of the spark plug 18 will be described. A continuous high voltage generator 40 is of the same principles as the second high voltage generator 30 of the first embodiment and it comprises a DC/DC converter which produces a high voltage of 4 to 10 KV from a DC input voltage $V_b$ from the battery.

The continuous high voltage generator 40 is of a type in which the DC voltage $V_b$ is converted into a pulse voltage, stepped up and then rectified to a DC voltage, and it comprises a transistor switching circuit including push-pull type transistors 41 and 42 and resistors 43 and 44, a transformer 45 for stepping up the pulse voltage from the transistor switching circuit and controlling the turning on and off of the transistors 41 and 42, a diode bridge circuit 46 for subjecting the stepped up AC voltage from the transformer 45 to full-wave rectification, a smoothing capacitor 47 and a resistor 48.

A periodic high voltage generator 20A is of a known type for applying periodically a high voltage of 10 to 20 KV to the electrodes 19 of the spark plug 18, and it is of the same construction as the first high voltage generator 20 of the first embodiment except the distributor 26. An interrupter is formed by the four-lobe cam 24 adapted to rotate once for every two revolutions of the output shaft of the engine 10 in synchronism therewith and the contacts 25 adapted to be opened and closed by the cam 24, and the contacts 25 are opened at near 40 to 5 degrees BTDC on the compression stroke to generate a high voltage from the ignition coil 22.

A distributor 50 distributes the high voltage generated from the high voltage generators 40 and 20A, respectively, to the electrodes 18 of the spark plug 18 mounted in each cylinder in synchronism with the rotation of the output shaft of the engine 10, and the distributor 50 is connected to the high voltage generators 40 and 20A through diodes 51 and 52, respectively.

The distributor 50 comprises a rotary electrode 53 rotated once for every two revolutions of the output shaft of the engine 10 in sync hronism therewith and fixed electrodes 54 each connected to the spark plug 18 mounted in each cylinder of the engine 10, and the portion of the rotary electrode 53 opposing the fixed electrodes 54 has an engle $\theta$ which is set to 90 degrees [180 degrees (=720 degrees/4 cylinders) in terms of crank angle degrees]. The four fixed electrodes 54 are arranged on the same circumference at equal spacing.

The distributor 50 may for example be constructed as shown in FIG. 13 so that the rotary electrode 53 is mounted on a shaft 55 which is rotated by the output shaft of the engine 10 and the fixed electrodes 54 are mounted in an electric insulating cap 56 to be opposite to the fixed electrode 53 through the air gap of about 0.2 mm. The rotary electrode 53 is connected to the diodes 51 and 52 through a carbon contctor 57 pressed against the electrode 53 by a spring and a terminal 58, and the fixed electrodes 54 are each connected to the spark plug 18 of each cylinder through a terminal 59.

The rotary electrode 53 and each fixed electrode 54 start to be opposite to each other in the range of 160° to 60° crank angle before TDC on the compression stroke, thus initiating the application of a high voltage.

With the present embodiment, the high voltage generators 40 and 20A are each constructed to generate a negative high voltage.

With the construction described above, during the suction stroke of each cylinder of the engine 10 the intake valve 17 is opened and the air-fuel mixture including a large quantity of the recirculated exhaust gas is introduced into the combustion chamber 11 through the intake port 16.

Then, when the piston 14 moves from the suction stroke into the compression stroke so that a crank angle in the range between 160 and 60 degrees before TDC on the compression stroke, e.g., 100 degrees before TDC on the compressed stroke is reached, the rotary electrode 53 starts to be opposite to the fixed electrode 54 in the distributor 50 and consequently a high voltage of about 4 to 10 KV is applied from the continuous high voltage generator 40 to the spark plug 18 of the corresponding cylinder.

When this occurs, a spark discharge is initiated between the discharge electrodes 19 of the spark plug 18, and the discharge is maintained by a current of 5 to 25 mA during the period in which the rotary electrode 53 is opposite to the fixed electrode 54 of the cylinder, i.e., the period of 180° in terms of crank angle degrees. Thus, if the discharge is initiated at 100 degrees BTDC on the compression stroke, it will be continued until 80° ATDC on the compression stroke.

The discharge between the discharge electrodes 19 now causes various chemical reactions among the air, fuel and residual exhaust gas between the electrodes and consequently radicals and atoms, such as, highly active components $C_2$, CH, CHO, OOH and H are produced. The radicals are compressed by the piston 14 to a higher degree of activation and a very excellent ignition quality is ensured.

Thereafter, when the piston 14 is further moved upward so that a crank angle in the range between 40 and 5 degrees before TDC on the compression stroke, e.g., 20 degrees before TDC on the compression stroke is reached, the periodic high voltage generator 20A generates a high voltage of about 10 to 20 KV and the high voltage is applied to the spark plug 18 through the distributor 50. Consequently, a spark discharge of a greater intensity is caused between the electrodes 19 of the spark plug 18, and the air-fuel mixture including the radicals and atoms is ignited positively.

In addition, the discharge energy is continuously supplied from the discharge electrodes 19 so that the nucleus of flame produced grows rapidly and positive explosion combustion is caused, thus ensuring high combustion efficiency and stable combustion.

When the crank angle of this cylinder attains 20 to 120 degrees, e.g., 80 degrees after TDC on the compression stroke, the distributor 50 stops the application of the high voltage to the spark plug 18 in the cylinder, and the high voltage is then applied to the spark plug of the next cylinder whose crank angle has attained 100 degrees before TDC on the compression stroke.

Thereafter, the above-mentioned operation is performed repeatedly, and the high voltage is applied to the spark plug 18 of all the cylinders in turn during the two revolutions of the output shaft of the engine 10.

In this connection, the ignition capacity of the ignition system can be detected from the concentration of HC which is an unburned component of the exhaust gases discharged from the engine 10. The experiments conducted by the inventors, etc., have shown that by setting the airfuel on A/F ratio of the mixture to a value which would cause a misfire in the case of the ordinary ignition system, e.g., 18:1, the HC concentration obtained with the system of this invention was about 27% less than that obtained with the ordinary ignition system.

While the above-described embodiment has been described as used in the operation of the four cylinder, four cycle engine and the high voltage application period is selected 720 degrees/four cylinders, the embodiment may of course be applied to two, three, five, six and eight cylinder engines.

The embodiment may also be used in the operation of multiple cylinder two cycle engines as well as Wankel type rotary engines (in this case, the number of rotors is considered as the number of cylinders). In this case, the high voltage application period is selected 360 degrees/the number of cylinders. In the case of such four cycle engine as V-type six cylinder engines or V-type eight cylinder engines in which the cylinders are arranged in two groups of three or four cylinders each and two distributors are used, the high voltage application period may be determined by dividing 720 degrees by the number of cylinders in one group.

Further, while, in this embodiment, both the continuous high voltage generator and the periodic high voltage generator are used, if a discharge current of over 20 mA can be ensured by the continuous high voltage generator, it is possible to cause explosive combustion by the compression-ignition process without using the periodic high voltage generator. However, depending on the type of engines, there are cases where the use of the continuous and periodic high voltage generators is effective under the no-load and low load conditions and it is preferable, under the full load operation, to stop the continuous high voltage generator and effect the ignition only by the periodic high voltage generator, and in such case both of the generators must be used.

Fourth Embodiment

This embodiment differs from the first embodiment in that there is further provided a radical producing spark plug and that a different manner of applying high voltages is used.

Referring to FIG. 14, the cylinder head 12 is formed with a radical producing chamber 61 which is smaller in volume than the combustion chamber 11 and communicated with the latter through a passage 60. Also a first spark plug 71 and the spark plug 18 or second spark plug are screwed into the cylinder head 12 in such a manner that discharge electrodes 72 of the first spark plug 71 are positioned in the inner part of the radical producing chamber 71 and the discharge electrodes 19 of the second spark plug 18 are positioned in the combustion chamber 11.

It should be noted that the combustion chamber 11 of the engine 10 is supplied with the air-fuel mixture as well as a large quantity of the exhaust recirculation gas supplied from the exhaust system (not shown) of the engine 10 through a known type of exhaust gas control valve which is not shown.

Next, an energizing means for energizing the first spark plug 71 will be described. In this energizing means, a first high voltage generator 80 periodically applies a high voltage of 10 to 25 KV to the spark plug 71 irrespective of the engine rotation so as to cause a periodic discharge between the electrodes 72 of the first spark plug 71, and it comprises an oscillator circuit 81, a waveform reshaping circuit 82, a switching circuit 83 and an ignition coil 84 connected to the spark plug 71 through a diode 85.

The oscillator circuit 81 which is basically an astable multivibrator, comprises inverters 81a and 81b, resistors 81c and 81d and a capacitor 81e and it generates timing pulses of a frequency in the range between 200 Hz and 2 KHz.

The waveform reshaping circuit 82 reshapes the timing pulses from the oscillator circuit 81, and it comprises inverters 82a, 82b and 82c and NAND gates 82d and 82e constituting a flip-flop.

The switching circuit 83 comprises resistors 83a, 83b, 83c and 83d and transistors 83e and 83f and it controls the supply of current to the primary winding of the ignition coil 84 in response to the timing pulses reshaped by the waveform reshaping circuit 82.

The ignition coil 84 is of a known type having a primary winding and a secondary winding, in which the current flow in the primary winding is switched on and off to induce a high voltage in the secondary winding.

A second high voltage generator 40 of the energizing means is basically identical in construction with the high voltage generator 40 of the third embodiment, and it applied a high voltage of about 2 KV to the first spark plug 71 so as to cause a continuous discharge between the electrodes 72 of the spark plug 71. The generator 40 is connected to the first spark plug 71 through a diode 86.

A third high voltage generator 20 which applies a high voltage of 10 to 25 KV to the second spark plug 18, is identical with the first high voltage generator 20 of the first embodiment, and it is of a known type which applies a high voltage to the spark plug in synchronism with the engine rotation. The ignition coil 22 is connected to the battery 21 through an engine key switch 28, and the distributor 26 is connected to the spark plug 18 through a diode 29. The third high voltage generator 20 applies a high voltage to the spark plug 18 at near 20 degrees BTDC on the compression stroke of the piston 14.

Although not shown in the Figure, the first and second high voltage generators 80 and 40 are provided for each cylinder of the engine 10, and a single unit of the third high voltage generator 20 distributes a high voltage to each of the cylinders. A DC voltage $V_{cc}$ is supplied from the battery 21 or other DC power source.

With the construction described above, during the suction stroke of the engine 10 the intake valve 17 is opened, so that the air-fuel mixture containing a large quantity of the recirculated exhaust gas is introduced into the combustion chamber 11 through the intake port 16, and the mixture first reaches the discharge electrodes 19 within the combustion chamber 11.

On the other hand, during the time from the suction stroke to the compression stroke and before the occurrence of explosive combustion the first high voltage generator 80 periodically applies a high voltage of 10 KV at a frequency of 200 Hz to 2 KHz to the discharge electrodes 72 of the first spark plug 71, and also the second high voltage generator 40 continuously applies a high voltage of 2 KV to the electrodes 72. When this occurs, a discharge is initiated between the electrodes 72 of the first spark plug 71. However, since the mixture flows in the form of a stratified charge into the radical producing chamber 61, as shown in FIG. 15, not only during the suction stroke but also when the piston 14 is near the BDC position after the suction stroke the burned gas G of the previous cycle is present around the discharge electrodes 72 and the mixture M exists in the radical producing chamber 61 close to the passage 60. Consequently, no combustion is initiated and there is no possibility of the engine 10 knocking or causing any abnormal premature ignition.

Then, when the piston 14 moves upward so that the compression stroke is initiated, in the radical producing chamber 61 the burned gas is gradually scavenged by the mixture and the mixture is gradually introduced into the vicinity of the discharge electrodes 72 of the spark plug 71 at the proper time.

As a result, the discharge between the discharge electrodes 72 initiates within the radical producing chamber 61 a semi-oxidation state chemical reaction or radical producing reaction of the mixture.

The resulting radicals are not diffused by a turbulent flow caused within the combustion chamber 11 by the upward movement of the piston 14 and the radicals are retained within the radical producing chamber 61 in their chemically activated state. The radicals are compressed by the piston 14 to a greater degree of activation and a very excellent ignition quality is ensured.

Thereafter, a high voltage is applied to the second spark plug 18 from the third high voltage generator 20 at near 20° crank angle BTDC, and consequently a spark discharge is caused beteen the discharge electrodes 19 of the second spark plug 18, thus initiating combustion of the mixture.

When the explosion combustion is initiated, the radicals are spouted from the radical producing chamber 61 into the combustion chamber 11, and the combustion of the mixture within the combustion chamber 11 is improved by the radicals. In other words, since the radicals are highly activated chemically, a very excellent ignition quality is ensured and the mixture containing the radicals is burned in the combustion chamber 11. Thus, even if the mixture is leaned out or the exhaust gas is recirculated in a large quantity to the intake system through the exhaust gas control valve (not shown), there is no danger of combustion lag and the combustion rate is prevented from decreasing, thus ensuring an excellent explosive combustion and thereby improving the fuel consumption and reducing the amount of $NO_x$ emissions.

While a high voltage generator of any type may be used to apply the required high voltage to the discharge electrodes 72 of the spark plug 71, by using, as in the present embodiment, the first high voltage generator 80 which applies a high voltage periodically and the second high voltage generator 40 which continuously applies a high voltage of as low as 2 KV, the periodic discharge caused between the discharge electrodes 72 by the first high voltage generator 80 serves as a trigger for continuous discharge and the high voltage from the second high voltage generator 40, though as low as about 2 KV, positively and stably initiates a continuous discharge. In other words, even if the pressure around the discharge electrodes 72 increases as during the compression stroke, by virtue of the high voltage applied periodically by the first high voltage generator 80, the continuous discharge caused by the second high voltage generator 40 is maintained without interruption. In this way, the occurrence of continuous discharge is ensured.

Thus, the combined effect of the first and second high voltage generators 80 and 40 has the effect of satisfactorily producing radicals within the radical producing chamber 61 and contributing to the occurrence of explosion combustion within the combustion chamber 11.

While, in the above-described embodiment, the high voltage from the second high voltage generator 40 (DC/DC converter) is applied to the first spark plug 71 throughout the entire strokes of the engine 10, it is possible to stop the application of high voltage from the combustion stroke to the exhaust stroke of the engine 10, that is, it is possible to effect the application of high voltage from the end of the suction stroke until the end of the compression stroke, thus reducing the consumption of power. This may be accomplished by connecting to the second high voltage generator 40 and the diode 86 a switch which is operated in synchronism with the rotation of the engine 10. The switch may for example comprise a disk rotary electrode which makes one rotation for every two revolutions of the engine crankshaft in synchronism with the rotation thereof and a fixed electrode mounted to a fixed portion of the engine in opposition to the outer surface of the disk rotary electrode. The construction of the switch may be such that the rotary electrode is mounted on the shaft driven by the engine and the disk rotary electrode has a sector of 90° cut off corresponding to an operational range from the combustion stroke to the exhaust stroke, The fixed electrode is connected to the spark plug 71 through the diode 86, and the rotary electrode is connected to the output of the DC/DC converter by way of a carbon contactor which vertically contacts axially with substantially the central portion of the disk rotary electrode.

While, in the above-described embodiment, radicals are always produced to effect radical-combustion during the operation of the engine 10, it is possible to effect the radical combustion only under any particular engine operation, e.g., low speed and low load operation where there are problems of fuel consumption and $NO_x$ emissions.

Further, while, in the embodiment, the discharge electrodes 19 of the second spark plug 18 are positioned in the combustion chamber 11, as shown in FIG. 16, a cylindrical housing 73 may be inserted in the cylinder head 12 to define a radical producing chamber 61, a passage 60 and a recess 74 and position the discharge electrodes 19 in the recess 74 near the passage 60. Also, by providing the previously mentioned switch between the second high voltage generator 40 and the first spark plug 71, it is possible to cut the application of high voltage and reduce the consumption of power during the time interval from the combustion stroke to the exhaust stroke of the engine.

Further, while, in the embodiment, the radical producing spark plug is a spark plug having discharge electrodes, it is possible to use a spark plug of a type which utilizes the wall surface of the combustion chamber as one of the discharge electrodes, and it is also possible to use a glow plug.

Further, while the embodiment has been described as used in the operation of the four cycle engines, it may also be used in the operation of two cycle engines as well as Wankel type rotary engines. In the case of the rotary engine, it is only necessary to use the plug aperture as a radical producing chamber. In other words, the radical producing chamber needs not always be communicated with the combustion chamber through a passage and it may simply be a recess-like pocket.

It will thus be seen that in accordance with the invention, the production of radicals has the effect of ensuring excellent combustion and thereby improving the fuel consumption and reducing the amount of $NO_x$ emissions even in cases where the air-fuel mixture is leaned out or the amount of exhaust gas recirculation (EGR) is increased.

Fifth Embodiment

This embodiment differs from the first embodiment in that a sub-combustion chamber is provided in such a location that the discharge electrodes of the spark plug are exposed to the sub-combustion chamber and that a different method is used to apply high voltages to the spark plug. In other words, in addition to the ordinary spark ignition high voltage, another high voltage is applied periodically to the spark plug prior to the occurrence of explosive combustion to cause a periodic discharge and still another high voltage is continuously applied to the spark plug to cause a continuous discharge, whereby the air-fuel mixture introduced into the combustion chambers is chemically activated.

Referring now to FIG. 17, bored out in the cylinder head 12 is a sub-combustion chamber 61 which is communicated with the combustion chamber 11 through a passage 60 and is smaller in volume than the former. The spark plug 18 is mounted in such a manner that the discharge electrodes 19 are positioned in the sub-combustion chamber 61.

It should be noted that the main combustion chamber 11 of the engine 10 is supplied with the air-fuel mixture as well as a large amount of the exhaust gas recirculation supplied from the exhaust system (not shown) of the engine through a known type of exhaust gas control valve which is not shown.

Next, high voltage generators for causing discharges between the electrodes 19 of the spark plug 18 will be described. A first high voltage generator 80 is identical in construction with the first high voltage generator 80 of the fourth embodiment, that is, the generator 80 applies periodically a high voltage of about 10 KV to the spark plug 18 irrespective of the engine rotation so as to cause a periodic discharge between the discharge electrodes 19 of the spark plug 18, and it is connected to the spark plug 18 through the diode 85.

A second high voltage generator 40A comprises the high voltage generator 40 (the DC/DC converter of FIG. 14) of the third and fourth embodiments and a synchronizing switch 49, and it is designed to apply a high voltage of about 2 KV to the spark plug 18 so as to cause a continuous discharge between the discharge electrodes 19 of the spark plug 18. The generator 40A is connected to the spark plug 18 through the diode 86.

The synchronizing switch 49 is designed so that the application of high voltage to the spark plug 18 from the second high voltage generator 40A is stopped during the time interval from the combustion stroke to the exhaust stroke of the engine 10 so as to reduce the consumption of power, and it comprises a rotary electrode 49a adapted to make one rotation for every two revolutions of the crankshaft of the engine 10 in synchronism with the rotation of the crankshaft and a fixed electrode 49b connected to the diode 86.

Figure 18:
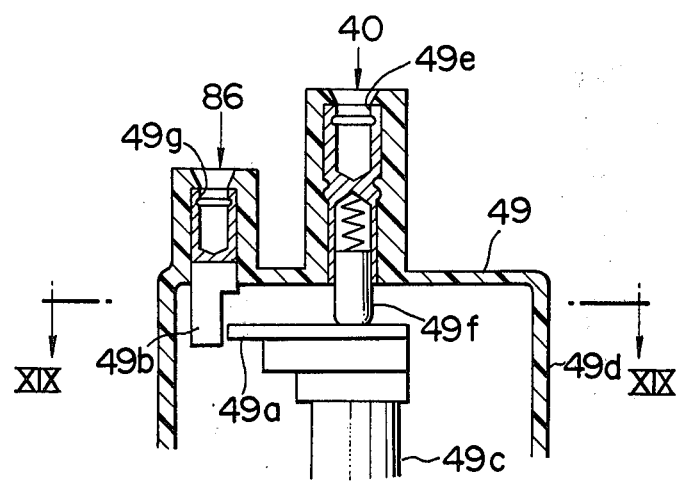
FIG. 18 is a sectional view showing the synchronizing switch shown in FIG. 17.
Figure 19:
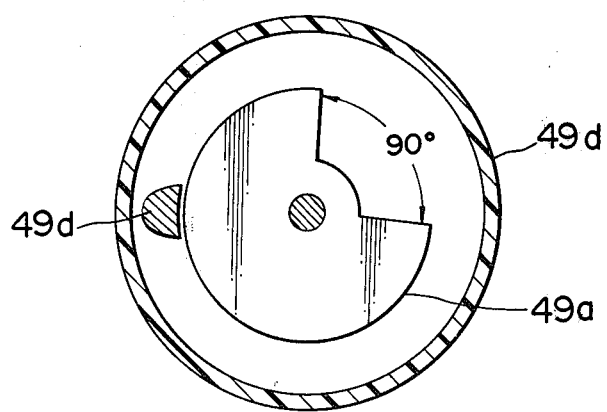
FIG. 19 is a sectional view taken along the line XIX—XIX of FIG. 18.

The synchronizing switch 49 may for example be constructed as shown in FIGS. 18 and 19, in which the rotary electrode 49a is mounted on a shaft 49c driven from the engine 10 and formed with a notch of 90° corresponding to the time interval from the combustion stroke to the exhaust stroke.

The fixed electrode 49b is fixedly mounted on an insulating cap 49d to face the rotary electrode 49a with a gap of about 0.2 mm. The rotary electrode 49a is connected to the DC/DC converter through a terminal 49e and a carbon contactor 49f, and the fixed electrode 49b is connected to the diode 86 through a terminal 49g.

Referring again to FIG. 17, a third high voltage generator 20 is identical in construction with the first high voltage generator 20 of the first embodiment (FIG. 1) and it is of a known type which applies a high voltage of 10 to 25 KV to the spark plug 18 in synchronism with the engine rotation. The distributor 26 (FIG. 1) which distributes a high voltage to each cylinder, is connected to the spark plug 18 through a diode 87. The third high voltage generator 20 applies a high voltage to the spark plug 18 at near 20 degrees BTDC on the compression stroke of the piston 14.

Although not shown in the FIGURE, the first and second high voltage generators 80 and 40A are provided for each cylinder of the engine 10, and a single unit of the third high voltage generator 20 distributes the required high voltage to each cylinder through the distributor 26.

With the construction described above, during the suction stroke of the engine 10 the intake valve 17 is opened and the air-fuel mixture containing a large quantity of the recirculated exhaust gas is introduced into the main combustion chamber 11 through the intake port 16. The mixture is then introduced into the sub-combustion chamber 61 as the piston 14 is moved upward on the compression stroke.

During the time interval from the suction stroke to the compression stroke the first high voltage generator 80 applies periodically a high voltage of 10 KV at a frequency of 200 Hz to 2 KHz to the spark plug 18, and the second high voltage generator 40A continuously applies a high voltage of 2 KV to the spark plug 18.

Consequently, a discharge is initiated between the electrodes 19 of the spark plug 18. However, since the mixture is in a low pressure state before the compression stroke and since the residual gas exists around the discharge electrodes 19, no explosive combustion is initiated and within the sub-combustion chamber 61 is initiated a semi-oxidation state chemical reaction which cannot be considered as an explosion combustion, thus producing radicals.

The radicals are not dispersed by a turbulent flow caused in the main combustion chamber 11 by the upward movement of the piston 14 and they are held within the sub-combustion chamber 61 in their chemically activated state. The radicals are then compressed by the piston 14 to a higher degree of activation and a very excellent ignition quality is ensured.

Thereafter, the third high voltage generator 20 applies a high voltage to the spark plug 18 at near 20° crank angle BTDC, so that the spark plug 18 produces a spark discharge and the radicals are positively ignited.

When the ignition occurs in this way, the flame and the radicals are spouted from the sub-combustion chamber 61 into the main combustion chamber 11 through the passage 60 and explosive combustion of the mixture is initiated within the main combustion chamber 11. Since the ignition of the mixture in the main combustion chamber 11 is also effected by the flame including the radicals, even though the mixture is leaned out or the exhaust gas is recirculated in a large quantity to the intake system through the exhaust gas control valve (not shown), the occurrence of combustion lag is prevented and the decrease in the combustion rate is prevented, thus ensuring satisfactory combustion.

This improved ignition quality has the effect of improving the fuel consumption of the engine 10 and also reducing the amount of $NO_x$ emissions.

To activate the air-fuel mixture and produce radicals, it is preferable to continuously apply a high voltage and cause a continuous discharge between the discharge electrodes. However, to use only the DC/DC converter which generates a voltage of the order of 2 KV is disadvantageous from the standpoint of a radical producing reaction in that the initiation of discharge and initial discharge become unstable and in particular they tend to become more unstable when the pressure around the discharge electrodes is increased for example during the compression stroke of the engine 10. While this difficulty can be overcome by increasing the output voltage of the DC/DC converter, increasing the output voltage to higher than 2 KV is disadvantageous from the standpoint of cost, power consumption, etc., since it requires the use of a heavier and larger transformer, etc.

On the other hand, while the first high voltage generator 80 has no problem from the standpoint of cost and power consumption since it is capable of generating a high voltage of higher than 2 KV and small in size, the high voltage is generated only periodically with the result that a discharge occurs periodically between the discharge electrodes 19 and the production of radicals is interrupted, thus making it difficult to ensure a chain propagation production of radicals.

With the present embodiment, however, in addition to the periodic application of high voltage by the first high voltage generator 80, the second high voltage generator 40A applies a high voltage which is as low as 2 KV but applied continuously, with the result that the periodic discharge caused between the discharge electrodes 19 by the first high voltage generator 80 serves as a trigger for a continuous discharge and the continuous discharge is positively initiated and maintained stably by the high voltage, though of the order of 2 KV, from the second high voltage generator 40A. Of course, even though the pressure around the discharge electrodes 19 increases as for example during the compression stroke, the periodic application of high voltage from the first high voltage generator 80 prevents interruption of the continuous discharge caused by the second high voltage generator 40A, thus ensuring the occurrence of a continuous discharge.

Thus, by virtue of the combined effect of the first and second high voltage generators 80 and 40A, the production of radicals within the sub-combustion chamber 61 is effected satisfactorily thus contributing to the occurrence of explosion combustion within the main combustion chamber 11.

While, in the embodiment described above, the application of high voltage from the second high voltage generator 40A is stopped during the time interval from the end of the combustion stroke to the exhaust stroke by the synchronizing switch 49 so as to reduce the power consumption, what is important here is to cause a continuous discharge and activate the air-fuel mixture during the time interval from the suction stroke to the compression stroke and consequently it is possible to effect the application of high voltage only during the time interval. Of course, where there is no need to reduce such power consumption, the use of such synchronizing switch may be eliminated. Further, the application of DC voltage $V_{cc}$ to the first and second high voltage generators 80 and 40A may be controlled through the synchronizing switch.

Further, while, in the present embodiment, the production of radicals and hence the radical-combustion are always carried out while the engine 10 is in operation, in the case of an engine which has problems of fuel consumption and $NO_x$ emissions at particular operations, e.g., low speed and low load operation, it is possible to effect the radical-combustion only under such operation.

Figure 20:
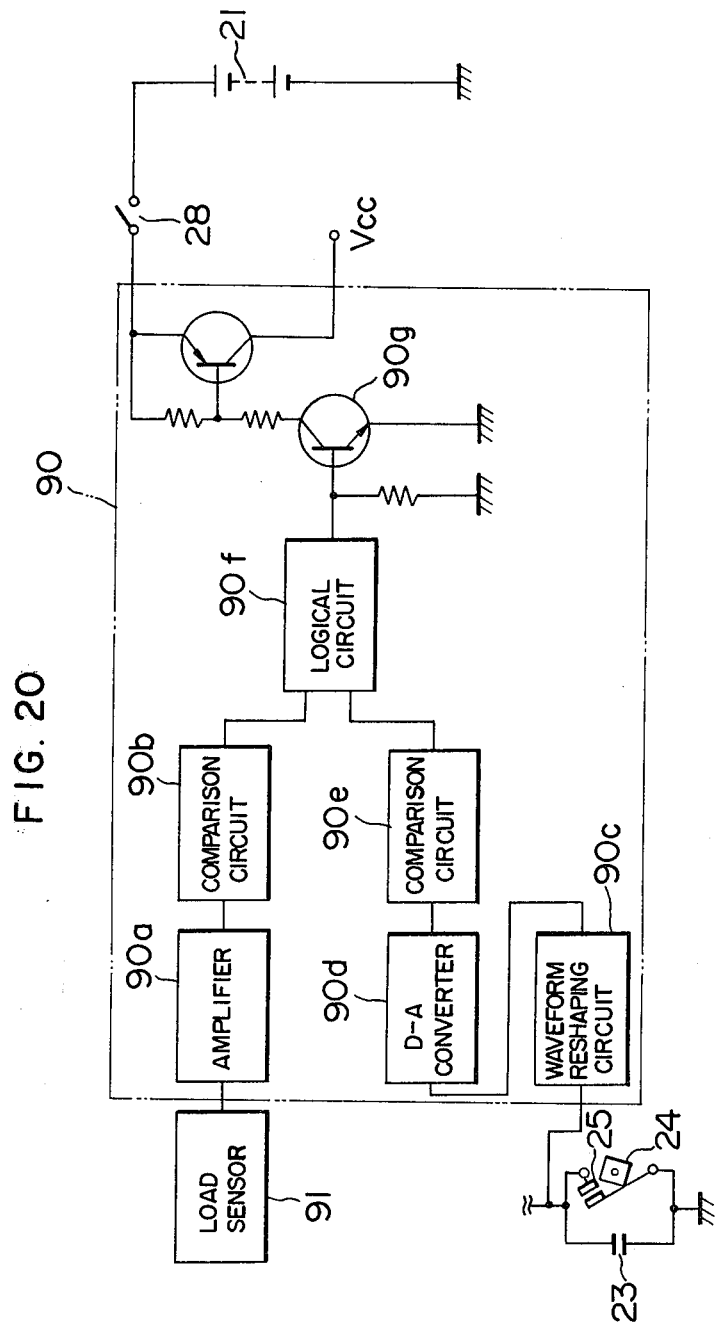
FIG. 20 is a block diagram showing the principal parts of another embodiment of the system.

In this case, a control circuit 90 shown in FIG. 20 may be used for the purpose. In the FIGURE, a load sensor 91 detects indirectly the load of the engine 10, such as, the intake vacuum or the throttle valve opening of the engine 10, and the control circuit 90 receives the load signal from the load sensor 91 and the pulse signal generated from the contacts 25 of the third high voltage generator 20 and having a frequency proportional to the engine speed.

The control circuit 90 comprises an amplifier 90a for amplifying the signal from the load sensor 91, a comparison circuit 90b for comparing the output voltage of the amplifier 90a with a preset voltage corresponding to a preset load, e.g., 2.0 Kg-m, a waveform reshaping circuit 90c for reshaping the pulse signal from the contacts 25, a D-A converter 90d for subjecting the reshaped pulse voltage to D-A conversion to generate an analog voltage, a comparison circuit 90e for comparing the output voltage of the D-A converter 90d with a preset voltage corresponding to a preset speed, e.g., 1,200 rpm, a logical circuit 90f for performing the logical operation on the output signals of the comparison circuits 90b and 90e, and a switching circuit 90g responsive to the output signal of the logical circuit 90f to control the application of DC voltage $V_{cc}$ to the first and second high voltage generators 80 and 40A.

In operation, when the engine 10 is at a low speed and low load operation where the load is lower than 2.0 Kg-m and the speed is lower than 1,200 rpm, a "1" signal is generated from each of the comparison circuits 90b and 90e so that the transistors of the switching circuit 90g are turned on and the voltage of the battery 21 is applied as $V_{cc}$ to the first and second high voltage generators 80 and 40A, thus bringing the engine 10 into a radical-combustion operation.

When the engine 10 is at any other operation, the transistors of the switching circuit 90g are turned off so that the current supply to the first and second high voltage generators 80 and 40A is stopped and the engine 10 is brought into the ordinary spark-ignition operation.

While, in the above-described operation, the spark plug electrodes are used as the discharge electrodes, it is possible to use the wall surface of the combustion chamber as one of the electrodes, and other types of discharge electrode may also be used.

While the ignition of the air-fuel mixture containing radicals is effected by the spark-ignition process employing the third high voltage generator 20, due to the improved ignition quality, the mixture may be ignited by the compression-ignition. Of course, even in the case of the compression-ignition, there is no need to increase the compression ratio as in the case of Diesel engines and a compression ratio of about the same order as the ordinary gasoline engine may be used.

Further, while the embodiment is used in the operation of the four cycle engine, the embodiment may also be used in the operation of two cycle engines, Wankel type rotary engines, etc.

Sixth Embodiment

This embodiment differs from the fifth embodiment in that there is provided a separate spark plug for spark ignition purposes and that flame arresting means is provided at the boundary of the main combustion chamber and the sub-combustion chamber (radical producing chamber) so as to arrest the propagation of flame from the sub-combustion chamber to the main combustion chamber and spout the radicals from the sub-combustion chamber to the main combustion chamber.

Figure 21:
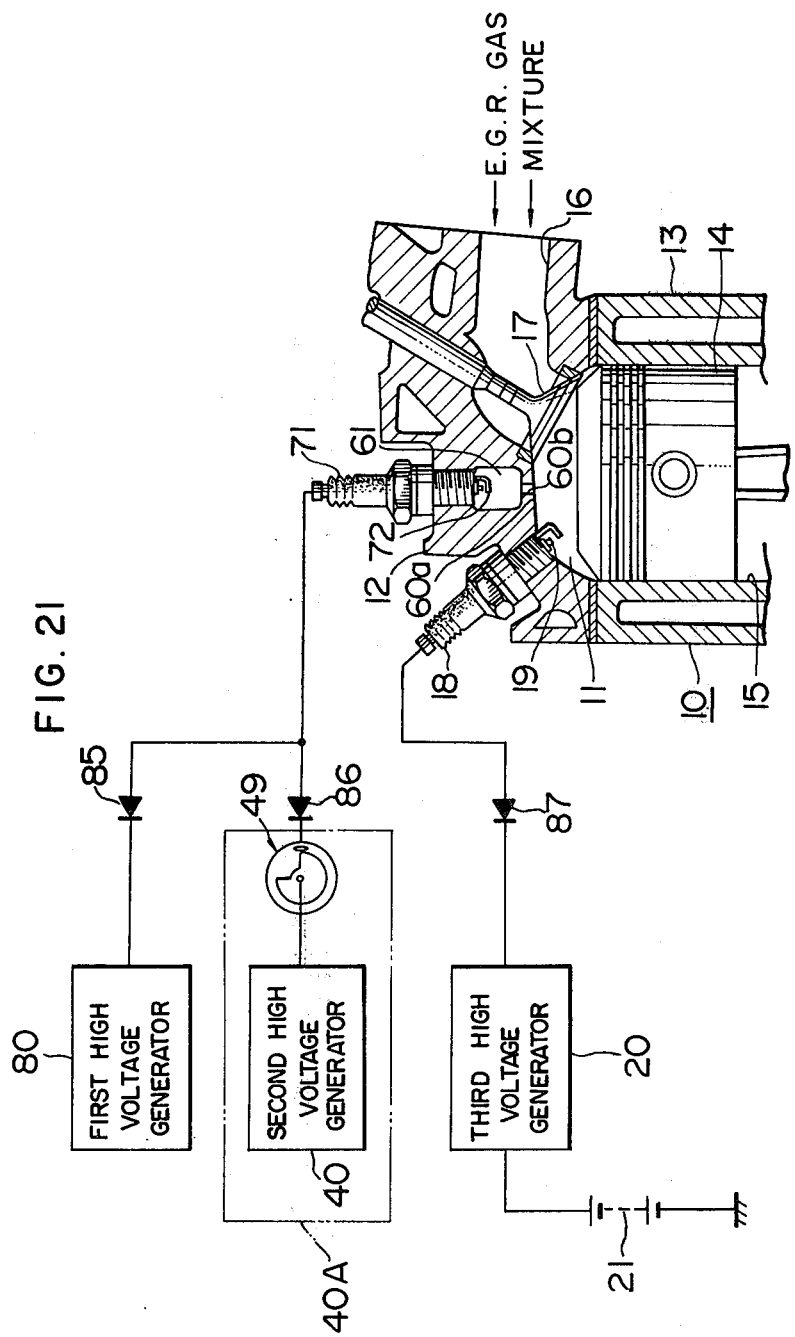
FIG. 21 is a schematic diagram showing the overall construction of a sixth embodiment of the system used with the invention.

Referring to FIG. 21, the combustion chamber 11 of the engine 10 is supplied with the air-fuel mixture as well as the exhaust gas recirculated from the exhaust system (not shown) of the engine 10 through a known type of exhaust gas control valve (not shown) in a large quantity, e.g., 15 to 25% of the amount of air drawn.

The carburetor (not shown) produces an air-fuel mixture which results in a gas-fuel ratio or G/F ratio of greater than 15:1. In this case, the G/F ratio represents (the amount of air flow + the amount of exhaust gas recirculation)/(the amount of fuel flow).

The radical producing chamber 61 which is bored out in the cylinder head 12 and smaller in volume than the combustion chamber 11, is connected to the latter chamber through a choke 60a. The choke 60a is of a type which has a flame arresting effect on the flame spouted from the radical producing chamber 61 to the combustion chamber 11 and it is in the form of a round opening having a diameter of about 2 to 4 mm and a cross-sectional area of about 13 to 3 mm². An open end 60b of the choke 60a opening to the combustion chamber 11, is formed into a sharp edged shape.

Also, first and second spark plugs 71 and 18 are screwed into the cylinder head 12 in a manner that the first spark plug 71 has its discharge electrodes 72 located in the inner part of the radical producing chamber 61 and the second spark plug 18 has its discharge electrodes 19 located in the combustion chamber 11.

Next, energizing means for energizing the first spark plug 71 will be described. The first high voltage generator 80 of the energizing means is identical in construction with the first high voltage generator (FIG. 14) of the fourth embodiment, namely, it periodically applies a high voltage of about 10 KV to the first spark plug 71 irrespective of the engine rotation so as to cause a periodic discharge between the discharge electrodes 72 of the first spark plug 71, and it is connected to the first spark plug 71 through the diode 85.

The second high voltage generator 40A of the energizing means is identical in construction with the second high voltage generator 40A of the fifth embodiment, that is, it applies a high voltage of about 2 KV to the first spark plug 71 so as to cause a continuous discharge between the discharge electrodes 72 of the spark plug 71, and it comprises the DC/DC converter 40 (FIG. 14) and the synchronizing switch 49 and connected to the first spark plug 71 through the diode 86.

As mentioned previously, the synchronizing switch 49 is designed so that the application of high voltage to the first high voltage 71 from the DC/DC converter 40 is interrupted during the time interval from the combustion stroke to the exhaust stroke of the engine so as to reduce the power consumption.

The third high voltage generator 20 which applies a high voltage of 10 to 25 KV to the second spark plug 18, is identical in construction with the first high voltage generator 20 (FIG. 1) of the first embodiment, that is, it is of a known type which effects the application of high voltage in synchronism with the engine rotation and it is connected to the second spark plug 18 through the diode 87. The third high voltage generator 20 applies its high voltage to the second spark plug 18 at near 20 degrees BTDC on the compression stroke of the piston 14.

Although not shown, the first and second high voltage generators 80 and 40A are provided for each cylinder of the engine 10, and a single unit of the third high voltage generator 20 distributes its high voltage to each of the cylinders through the distributor. In the present embodiment, the first, second and third high voltage generators 80, 40A and 20 are each designed to apply a negative high voltage to an associated one of the spark plugs 71 and 18.

With the construction described above, during the suction stroke of the engine 10 the intake valve 17 is opened and the air-fuel mixture containing a large quantity of the recirculated exhaust gas is introduced into the combustion chamber 11 through the intake port 16.

On the other hand, during the time interval from the suction stroke to the compression stroke and before the occurrence of explosive combustion of the mixture, the first high voltage generator 80 periodically applies a high voltage of 10 KV at a frequency of 200 Hz to 2 KHz to the discharge electrodes 72 of the first spark plug 71 and the second high voltage generator 40A continuously applies a high voltage of 2 KV to the discharge electrodes 72. Consequently, a discharge is initiated between the discharge electrodes 72 of the first spark plug 71. When the discharge occurs in this way, within the radical producing chamber 61 is initiated a semi-oxidation state chemical reaction of the mixture which cannot be considered as an explosive combustion and radicals are produced.

Of course, even though some flame is caused within the radical producing chamber 61, the flame is arrested by the choke 60a with the result that no combustion of the mixture is initiated within the combustion chamber 11 and the engine 10 is prevented from knocking or causing any abnormal premature combustion.

The resulting radicals are not diffused by the turbulences caused within the combustion chamber 11 by the upward movement of the piston 14 and the radicals are held within the radical producing chamber 61 in their chemically activated state. Then, due to the compression by the piston 14 the radicals are activated to a greater degree and a very excellent ignition quality is now ensured. When the pressure within the radical producing chamber 61 is increased by the production of the radicals, the radicals are spouted into the combustion chamber 11 through the choke 60a.

Thereafter, at near 15° to 20° crank angle BTDC the third high voltage generator 20 applies its high voltage to the second spark plug 18 so that a spark discharge is caused at the discharge electrodes 19 of the second spark plug 18 and explosion combustion of the mixture is initiated in the combustion chamber 11. In this case, since the radicals are highly activated chemically and have a very excellent ignition quality and since the mixture containing the radicals is burned in the combustion chamber 11, the radicals are converted into a large number of combustion nucleuses with the result that even a large amount of the exhaust gas is recirculated to the intake system through the exhaust gas control valve (not shown), the occurence of combustion lag is eliminated and decrease in the combustion rate is prevented, thus ensuring improved explosive combustion.

This improved combustion has the effect of improving the fuel consumption of the engine 10 and also reducing the amount of $NO_x$ emsissions.

While other types of high voltage generator may be used to apply the required high voltage to the discharge electrodes 72 of the first spark plug 71, by using, as in the present embodiment, the second high voltage generator 40A which continuously applies a high voltage, though as low as 2 KV, in addition to the application of periodic high voltage from the first high voltage generator 80, a periodic discharge caused between the discharge electrodes by the first high voltage generator 80 serves as a trigger for a continuous discharge and consequently the high voltage from the second high voltage generator 40A, though on the order of 2 KV, positively initiates the continuous discharge, thus ensuring stable production of radicals. In other words, even the pressure around the discharge electrodes 72 is increased as for example during the compression stroke, due to the periodic application of high voltage from the first high voltage generator 80, the continuous discharge caused by the second high voltage generator 40A is not interrupted and the continuous discharge is maintained reliably. Thus, due to the combined effect of the first and second high voltage generators 80 and 40A, the desired chemical reactions take place in a chain propagative manner and radicals are produced satisfactorily, thus contributing to the occurrence of explosion combustion in the combustion chamber.

While, in the embodiment described above, during the time interval from the end of the combustion stroke to the exhaust stroke the application of high voltage from the second high voltage generator 40A is interrupted by the synchronizing switch 49 so as to reduce the power consumption, what is important here is to cause a continuous discharge and activate the mixture during the compression stroke before the occurrence of explosion combustion of the mixture and consequently the application of high voltage may be effected only during this time interval.

Further, while the synchronizing switch 49 is provided on the high voltage side, it may be provided on the low voltage side, that is, it may be provided to control the DC voltage $V_{cc}$ applied to the first and second high voltage generators 80 and 40A. Of course, where there is no need to reduce the power consumption, the use of such synchronizing switch may be eliminated.

Further, while, in this embodiment, the production of the radicals is always effected for radical-combustion purposes during the operation of the engine 10, in the case of an engine which has problems of fuel consumption and HC and $NO_x$ emissions under certain operating conditions, e.g., low speed and low load operation, the radical-combustion may be effected particularly during such operation.

In this case, the control circuit 90 shown in FIG. 20 may be used. The control circuit 90 operates in the same manner as described in connection with the fifth embodiment, so that when the engine 10 is at a low speed and low load operation where the load is lower than 2.0 Kg-m and the speed is 1,200 rpm, the voltage of the battery 21 is applied as $V_{cc}$ to the first and second high voltage generators 80 and 40A and the engine 10 is brought into a radical-combustion operation.

When the engine 10 is at any other operation, the energization of the first and second high voltage generators 80 and 40A are stopped, and the engine 10 is brought into the ordinary spark-ignition operation by means of the second spark plug 18 and the third high voltage generator 20.

Figure 22:
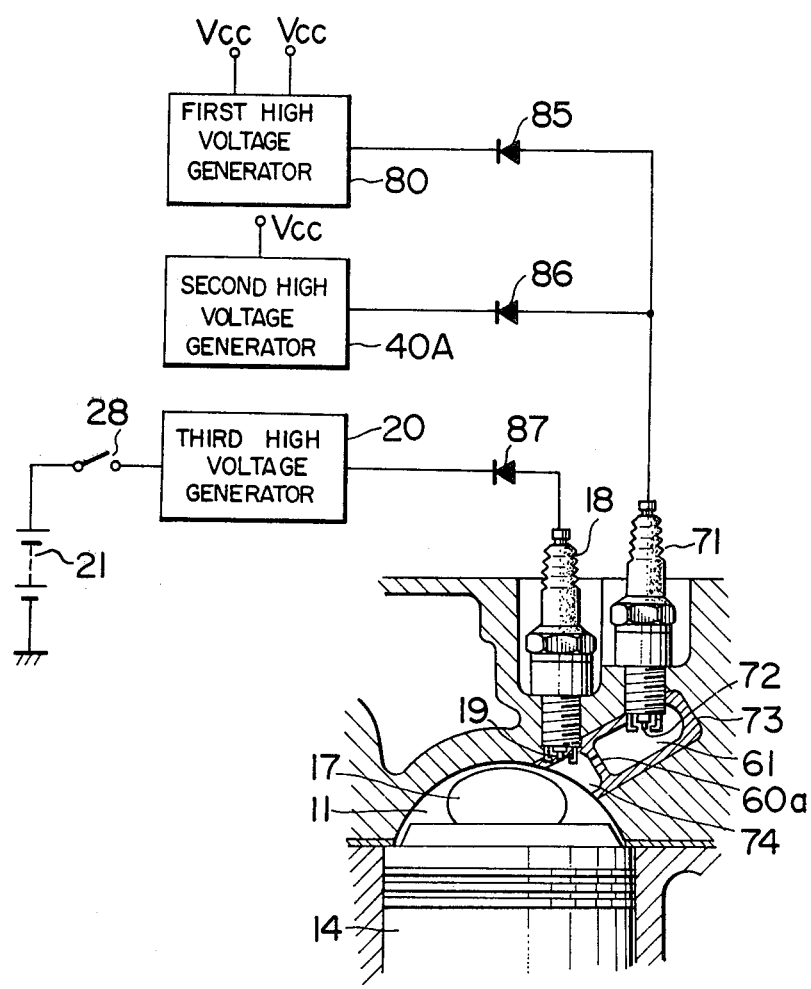
FIG. 22 is a diagram showing the construction of another embodiment of the radical producing chamber.

Further, while in this embodiment, the discharge electrodes 19 of the second spark plug 18 are directly located within the combustion chamber 11, as shown in FIG. 22, a cylindrical housing 73 may be inserted in the cylinder head 12 so that the radical producing chamber 61, the choke 60a and the recess 74 are defined by the housing 73 and the discharge electrodes 19 are located in the recess 74 forming a part of the combustion chamber 11 in the vicinity of the choke 60a. Also in this case, the synchronizing switch 49 may be used in combination with the second high voltage generator 40A so as to reduce the power consumption.

Figure 23:
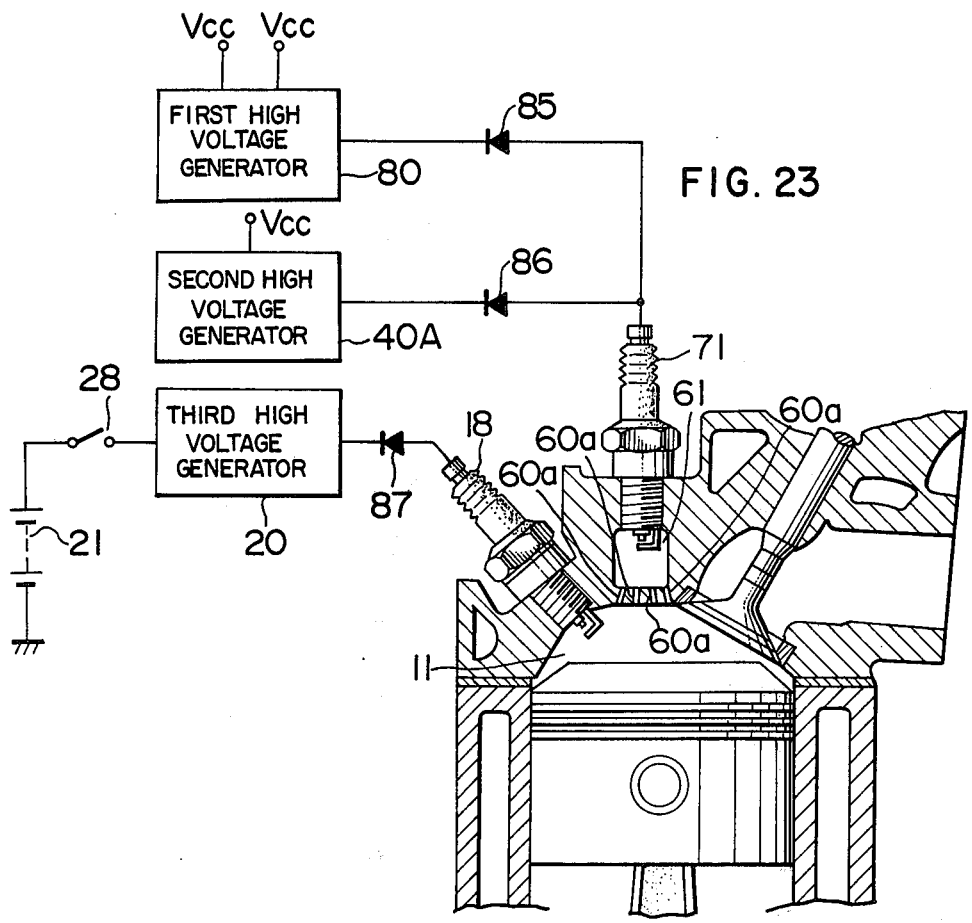
FIG. 23 is a sectional view showing the principal parts of another form of the choke holes shown in FIG. 21.

Further, while, in this embodiment, the radical producing chamber 61 is communicated with the combustion chamber 11 through the single choke 60a having a flame arresting function, as shown in FIG. 23, the chambers may be communicated with each other through a plurality of chokes 60a (four in the Figure). Of course, each of the chokes 60a must have a cross-sectional area of about 13 to 3 mm² so as to serve the flame arresting function.

Figures 24, 25:
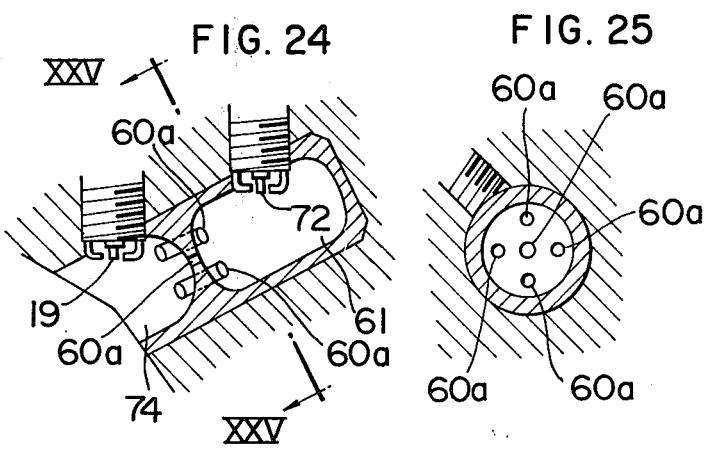
FIG. 24 is a sectional view showing the principal parts of still another form of the choke holes shown in FIG. 22.
FIG. 25 is a sectional view taken along the line XXV—XXV of FIG. 24.

Further, in the embodiment shown in FIG. 22, the chambers may be intercommunicated with a plurality of chokes 60a as shown in FIGS. 24 and 25, respectively (the number of chokes is 5 in FIGS. 24 and 25). With the modifications shown in FIGS. 23 to 25, the synchronizing switch 49 may be used to reduce the power consumption.

Figure 26:
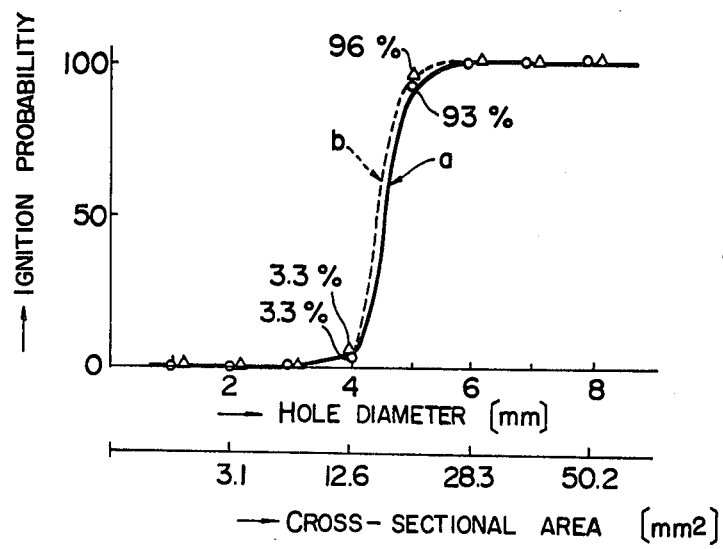
FIG. 26 is a graph useful for explaining the operation of the system.
Figure 27:
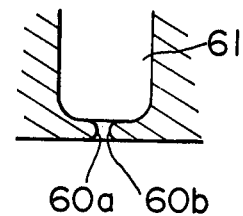
FIG. 27 is a sectional view showing still another form of the choke holes shown in FIG. 21.

Shown in FIG. 26 are the experimental results proving the flame arresting effect of the plurality of chokes 60a, and in the Figure the data marked with shows the case using the four chokes 60a as shown in FIG. 23 and the data with Δ the case using the five chokes 60a as shown in FIGS. 24 and 25. It will be seen from FIG. 26 that by selecting the cross-sectional area of the choke 60a less than 13 mm$^2$, it is possible to reduce the ignition probability from several to zero % and thereby to ensure an excellent flame arresting effect. Further, while, in the embodiment shown in FIG. 21, the open end 60b of the choke 60a opening to the combustion chamber 11 is formed into a sharp edged shape, the open end 60b may be formed into a Venturi shape having a curved surface as shown in FIG. 27. In this case, the opening area of the narrowest portion of the choke 60a must be in the range between 13 and 3 mm$^2$.

Further, while, in the above-described embodiment, the choke 60a is adapted to perform a flame arresting function, the choke may be in the form of a grating or honeycomb or alternatively the cross-sectional area of the choke may be increased so as to insert in this portion a flame arresting member of a grating or honeycomb structure.

Figure 28:
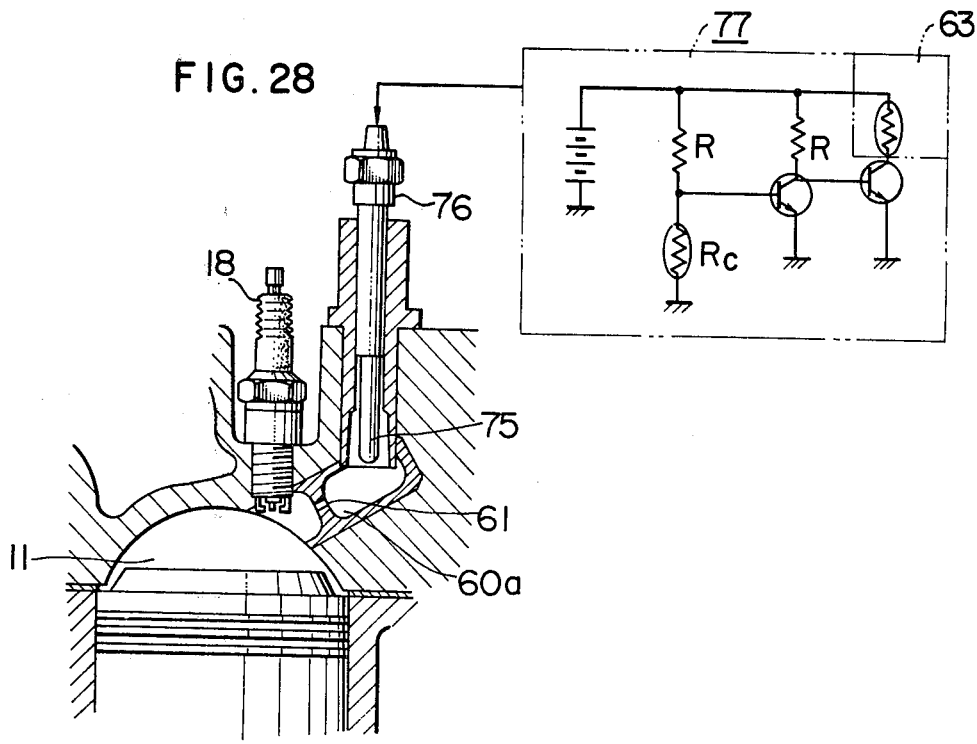
FIG. 28 is a schematic diagram showing the overall construction of still another embodiment of the system used with the invention.

Further, while, in the embodiment, the radical producing spark plug comprises a spark plug having discharge electrodes, it is possible to use a spark plug of the type which utilizes the wall surface of the combustion chamber as one of the electrodes or alternatively a glow plug 76 having a heater 75 at its forward end as shown in FIG. 28 may be used. In this case, the supply of current to the glow plug 76 should preferably be controlled by energizing means 77 so that the temperature of the heater 75 is maintained practically constant.

Further, while the embodiment is used in the operation of the four cycle engine, it may also be used in the operation of two cycle engines, Wankel type rotary engines, etc. Seventh Embodiment:

This embodiment differs from the fifth embodiment in that there is provided at the boundary of the subcombustion chamber (radical producing chamber) and the combustion chamber flame arresting means for arresting the propagation of flame from the sub-combustion chamber to the combustion chamber. This embodiment also differs from the sixth embodiment in that while, in the sixth embodiment, the second spark plug 18 (FIG. 21) is used to ignite the mixture in the combustion chamber 11, in the present embodiment the compression-ignition operation is effected without using the second spark plug 18 (using only the first spark plug) by virtue of the very excellent ignition quality of the radicals.

Referring to FIG. 29, the spark plug 71 is connected to the third high voltage generator 20 as well as the first and second high voltage generators 80 and 40A, so that the high voltage applied from the third high voltage generator 20 serves as a trigger for compression-ignition and the radicals in the radical producing chamber 61 and the mixture in the combustion chamber 11 are compression ignited. Of course, depending on the type of engines, it is possible to accomplish the compression-ignition operation without using the third high voltage generator 20 and there is no need to increase the compression ratio as in the case of Diesel engines but about the same compression ratio as the ordinary gasoline engine may be used.

In addition, the power consumption can be reduced by using the synchronizing switch 49 is combination with the second high voltage generator 40A.

Further, while, the present embodiment is used in the operation of the four cycle engine, it may also be used in the operation of two cycle engines, Wankel type rotary engines, etc.

It will thus be seen from the foregoing that the present invention has among its great advantages the fact that since a lasting discharge is caused between the discharge electrodes in the radical producing chamber so as to produce radicals satisfactorily and use the same to ignite the air-fuel mixture, even if the mixture is leaned out or the amount of exhaust gas recirculation (EGR) is increased, satisfactory combustion is ensured thus improving the fuel consumption and reducing the amount of NO$_x$ emissions. Another advantage is that even though the radical producing discharge electrodes are energized, there is no danger of the engine knocking or causing abnormal premature ignition.

We claim:

1. An internal combustion engine including a cylinder head, a cylinder block coupled with said cylinder head, a piston housed in said cylinder block to define a combustion chamber therein with said cylinder head, an intake port for introducing an air-fuel mixture into said combustion chamber during a suction stroke of the engine, an exhaust port for exhausting a residual gas, and an intake valve positioned at said intake port to open and close the same, comprising:
    a first spark plug mounted in said cylinder head to expose its electrodes to said combustion chamber; and
    a first spark discharge control circuit coupled with said spark plug for starting a spark discharge at said spark plug at a predetermined time during the suction stroke and for continuing said spark discharge during at least a first half of a compression stroke, thereby producing radicals by modifying said air-fuel mixture around said electrodes so that the entire air-fuel mixture introduced into said combustion chamber can be readily and completely burnt, and
    wherein said cylinder head is provided with a radical producing chamber communicated with said combustion chamber, and said spark plug is so mounted as to expose its electrodes into said radical producing chamber thereby to retain said radicals in said radical producing chamber, and
    wherein said radical producing chamber is provided with a flame arrester through which said radical producing chamber communicates with said combustion chamber, whereby the flame which may be caused by said spark discharge started during the suction stroke is effectively extinguished by said flame arrester.

2. An internal combustion engine as claimed in claim 1, further comprising a second spark plug mounted in said cylinder head to expose its electrodes to said combustion chamber and an ignition control circuit coupled with said second spark plug to cause a sharper and larger spark than said spark started during the suction stroke at said electrodes of said second spark plug thereby to secure better ignition of the mixture in said combustion chamber.

3. An internal combustion engine as claimed in claim 1, further comprising a second spark discharge control circuit coupled with said first spark plug for generating a series of pulses at a fixed frequency to apply it to said spark plug thereby to help produce said radicals.

4. An internal combustion engine as claimed in claim 1, further comprising an interrupter disposed between said first spark discharge control circuit and said first spark plug for cutting an application of the voltage produced in said first spark discharge control circuit to said first spark plug during the time when the engine is in combustion and exhaust strokes to prevent waste of electricity.

5. An internal combustion engine as claimed in claim 1, wherein said radical producing chamber is communicated with said combustion chamber through a hole having a cross-sectional area substantially smaller than a cross sectional area of said radical producing chamber.

6. An internal combustion engine as claimed in claim 5, wherein said cross-sectional area of said hole is in a range between 3 to 12 mm$^2$.

7. An internal combustion engine including a cylinder head, a cylinder block coupled with said cylinder head, a piston housed in said cylinder block to define a combustion chamber therein with said cylinder head, an intake port for introducing an air-fuel mixture into said combustion chamber during a suction stroke of the engine, an exhaust port for exhausting a residual gas, and an intake valve positioned at said intake port to open and close the same, comprising:

a first spark plug mounted in said cylinder head to expose its electrodes to said combustion chamber;

a first spark discharge control circuit coupled with said first spark plug to cause a spark discharge at said electrodes from such time as the engine nearly concludes its suction stroke, thereby producing radicals from said air-fuel mixture around said electrodes so that the entire air-fuel mixture introduced into said combustion chamber can be readily and completely burnt;

a second spark discharge control circuit coupled with said first spark plug for generating a series of pulses at a fixed frequency to apply it to said first spark plug thereby to help produce said radicals;

an interrupter disposed between said first spark discharge control circuit and said first spark plug for cutting an application of the voltage produced in said first spark discharge control circuit to said first spark plug during the time when the engine is in combustion and exhaust strokes to save waste of electricity;

a radical producing chamber provided in said cylinder head and being communicated with said combustion chamber, said first spark plug being so mounted as to expose its electrodes into said radical producing chamber thereby to retain said radicals in said radical producing chamber;

said radical producing chamber being provided with a flame arrester including a plurality of holes through which said radical producing chamber communicates with said combustion chamber, whereby the flame which may be caused by said spark discharge is effectively extinguished by said flame arrester; and a second spark plug mounted in said cylinder head to expose its electrodes to said combustion chamber and an ignition control circuit coupled with said second spark plug to cause a sharper and larger spark than said spark discharge at said electrodes of said second spark plug thereby to secure better ignition of the mixture in said combustion chamber.

* * * * *

UNITED STATES PATENT AND TRADEMARK OFFICE
CERTIFICATE OF CORRECTION

PATENT NO. : 4,287,862
DATED : September 8, 1981
INVENTOR(S) : Masaaki NOGUCHI, Taro TANAKA & Yoji KATO It is certified that error appears in the above—identified patent and that said Letters Patent is hereby corrected as shown below:

Item [30]   Foreign Application Priority Data

Please add:

February 10, 1978   Japan.....53-14740

Signed and Sealed this

Twentieth Day of April 1982

[SEAL]

Attest:

GERALD J. MOSSINGHOFF

Attesting Officer   Commissioner of Patents and Trademarks